US010839149B2

(12) United States Patent
Gururajan et al.

(10) Patent No.: US 10,839,149 B2
(45) Date of Patent: Nov. 17, 2020

(54) GENERATING TEMPLATES FROM USER'S PAST DOCUMENTS

(71) Applicant: MICROSOFT TECHNOLOGY LICENSING, LLC, Redmond, WA (US)

(72) Inventors: Arunkumar Gururajan, Redmond, WA (US); Mihai Aldea, Issaquah, WA (US); Theodor J. Scott, Redmond, WA (US); Kamal Choudhary, Redmond, WA (US); Eugene Chudin, Kirkland, WA (US); Si-Qing Chen, Bellevue, WA (US); Daniel R. Snyder, Bellevue, WA (US); Michelle Keslin, Kirkland, WA (US); Jeff D. Jarrard, Issaquah, WA (US); Sanjeev Bagaria, Sammamish, WA (US); John Hoegger, Woodinville, WA (US); Cynthia Guo, Marlboro, NJ (US); Tony Y. Tzeng, Mercer Island, WA (US); Jin Hee Lim, Kirkland, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 503 days.

(21) Appl. No.: 15/349,821

(22) Filed: Nov. 11, 2016

(65) Prior Publication Data
US 2017/0220545 A1     Aug. 3, 2017

Related U.S. Application Data

(63) Continuation-in-part of application No. 15/191,456, filed on Jun. 23, 2016, now Pat. No. 9,922,022.

(Continued)

(51) Int. Cl.
*G06F 40/186* (2020.01)
*G06F 3/0482* (2013.01)
(Continued)

(52) U.S. Cl.
CPC ........ *G06F 40/186* (2020.01); *G06F 3/0482* (2013.01); *G06F 40/106* (2020.01); *G06F 40/194* (2020.01)

(58) Field of Classification Search
CPC ..................................... G06F 17/24
(Continued)

(56) References Cited

U.S. PATENT DOCUMENTS

| 4,139,901 A | 2/1979 | Ganske et al. |
| 6,189,002 B1 | 2/2001 | Roitblat |

(Continued)

FOREIGN PATENT DOCUMENTS

| EP | 1748365 A1 | 1/2007 |
| JP | 2005209071 | 8/2005 |
| JP | 2009271844 | 11/2009 |

OTHER PUBLICATIONS

Zheng et al., "Dynamic clustering analysis of documents based on cluster centroids," Proceedings of the 2003 International Conference on Machine Learning and Cybernetics (IEEE Cat. No. 03EX693), Xi'an, 2003, pp. 194-198.*

(Continued)

Primary Examiner — Maikhanh Nguyen
(74) Attorney, Agent, or Firm — Merchant & Gould

(57) ABSTRACT

Automatic generation of document templates based on recognized composition element patterns in a group of clustered documents is provided. Composition elements used in documents are typically unique to a particular user or to a group of users. An automated template generation system detects composition element patterns in documents associ- (Continued)

ated with a given user. Sequences of composition elements from one document are aligned with sequences of composition elements of one or more other documents. The aligned sequences are scored to generate a document distance matrix. The documents are clustered together based on the alignment scores and a document template is generated for each corresponding cluster of documents. In one or more aspects, selecting a document template and updating it results in a modified document template or, in certain cases, a new document template. The generated document templates are displayed in a user interface for selection by a user.

20 Claims, 14 Drawing Sheets

Related U.S. Application Data

(60) Provisional application No. 62/289,509, filed on Feb. 1, 2016.

(51) Int. Cl.
  *G06F 40/106* (2020.01)
  *G06F 40/194* (2020.01)
(58) Field of Classification Search
  USPC .......................................................... 715/243
  See application file for complete search history.

(56) References Cited

U.S. PATENT DOCUMENTS

| | | | |
|---|---|---|---|
| 6,351,755 B1 | 2/2002 | Najork et al. | |
| 7,127,670 B2 | 10/2006 | Bendik | |
| 7,149,347 B1 | 12/2006 | Wnek | |
| 7,225,401 B2 | 5/2007 | Purvis | |
| 7,836,012 B1 | 11/2010 | Nevill-Manning et al. | |
| 7,844,896 B2 | 11/2010 | Ohashi et al. | |
| 7,966,204 B1 | 6/2011 | Hail et al. | |
| 8,154,774 B2 | 4/2012 | Shinkawa | |
| 8,176,412 B2 | 5/2012 | Bhandar et al. | |
| 8,255,397 B2* | 8/2012 | Gollapudi | G06F 16/313 707/736 |
| 8,356,045 B2 | 1/2013 | Chang et al. | |
| 8,719,699 B2 | 5/2014 | O'Brien | |
| 9,141,691 B2 | 9/2015 | Goerke et al. | |
| 9,195,639 B2* | 11/2015 | Anderson | G06F 40/186 |
| 9,235,758 B1 | 1/2016 | Agrawal et al. | |
| 9,268,761 B2* | 2/2016 | Baldwin | G06T 11/001 |
| 9,330,065 B2 | 5/2016 | Damera-Venkata | |
| 9,582,483 B2* | 2/2017 | DeRoller | G06F 40/174 |
| 9,922,022 B2 | 3/2018 | Masson et al. | |
| 2001/0042083 A1 | 11/2001 | Saito et al. | |
| 2003/0182268 A1 | 9/2003 | Lal | |
| 2004/0102958 A1 | 5/2004 | Anderson | |
| 2004/0163048 A1 | 8/2004 | McKnight et al. | |
| 2005/0055635 A1 | 3/2005 | Bargeron et al. | |
| 2005/0154701 A1 | 7/2005 | Parunak et al. | |
| 2005/0154779 A1 | 7/2005 | Cypher et al. | |
| 2005/0162677 A1 | 7/2005 | Toumanova et al. | |
| 2005/0268227 A1* | 12/2005 | Carlson | G06F 40/186 715/223 |
| 2006/0080329 A1 | 4/2006 | Skibo et al. | |
| 2006/0080361 A1 | 4/2006 | Suzuki et al. | |
| 2006/0106847 A1* | 5/2006 | Eckardt, III | G06F 16/3323 |
| 2006/0149751 A1* | 7/2006 | Jade | G06F 9/451 |
| 2006/0224952 A1 | 10/2006 | Lin | |
| 2007/0028166 A1 | 2/2007 | Hundhausen et al. | |
| 2007/0079236 A1 | 4/2007 | Schrier et al. | |
| 2008/0072140 A1 | 3/2008 | Vydiswaran et al. | |
| 2008/0104504 A1 | 5/2008 | Gimson et al. | |
| 2008/0109248 A1 | 5/2008 | Dietz | |
| 2008/0209313 A1 | 8/2008 | Gonser | |
| 2008/0288861 A1 | 11/2008 | Jones et al. | |
| 2010/0167311 A1 | 7/2010 | Canters et al. | |
| 2010/0191748 A1 | 7/2010 | Martin et al. | |
| 2010/0254604 A1 | 10/2010 | Prabhakara et al. | |
| 2010/0313119 A1* | 12/2010 | Baldwin | G06T 11/001 715/256 |
| 2011/0238664 A1 | 9/2011 | Pedersen | |
| 2011/0258535 A1 | 10/2011 | Adler, III et al. | |
| 2011/0264711 A1 | 10/2011 | Thang | |
| 2011/0296298 A1 | 12/2011 | Ahuja et al. | |
| 2012/0051657 A1* | 3/2012 | Lamanna | G06F 40/194 382/218 |
| 2012/0191716 A1 | 7/2012 | Omoigui | |
| 2012/0278341 A1 | 11/2012 | ogilvy et al. | |
| 2012/0303697 A1 | 11/2012 | Alstad | |
| 2013/0080886 A1* | 3/2013 | Anderson | G06F 40/186 715/256 |
| 2013/0091422 A1* | 4/2013 | Potnis | G06F 17/2229 715/255 |
| 2013/0097168 A1 | 4/2013 | Chang et al. | |
| 2013/0246231 A1 | 9/2013 | Weekley et al. | |
| 2014/0019851 A1* | 1/2014 | DeRoller | G06F 40/186 715/243 |
| 2014/0173422 A1* | 6/2014 | Stone | G06K 9/00442 715/244 |
| 2014/0188574 A1 | 7/2014 | Luca | |
| 2014/0281930 A1 | 9/2014 | Liu et al. | |
| 2014/0344952 A1 | 11/2014 | Kulick et al. | |
| 2015/0019589 A1 | 1/2015 | Arroyo et al. | |
| 2015/0161261 A1 | 6/2015 | Griddaluru | |
| 2016/0098405 A1 | 4/2016 | Gorbansky et al. | |
| 2016/0124918 A1* | 5/2016 | Ying | G06F 16/9535 715/234 |
| 2017/0220544 A1 | 8/2017 | Masson et al. | |

OTHER PUBLICATIONS

H. Jeong, "Clustering Algorithm Using Quoting Relation of Documents," 2008 Second International Conference on Future Generation Communication and Networking Symposia, Sanya, 2008, pp. 29-34.*

Wang et al., "A new partitioning based algorithm for document clustering," 2011 Eighth International Conference on Fuzzy Systems and Knowledge Discovery (FSKD), Shanghai, 2011, pp. 1741-1745.*

Thenmalar, et al., "Automatic Generation of Templates using Ontology", In Proceedings of the Third International Symposium on Women in Computing and Informatics, Aug. 10, 2015, pp. 668-672.

"DocumentFormat.OpenXml.Wordprocessing namespace", Retrieved on: Aug. 19, 2016 Available at: https://msdn.microsoft.com/en-us/library/documentformat.openxml.wordprocessing(v=office.15).aspx.

Mather, Paul M., "Computer Processing of Remotely-Sensed Images: An Introduction", In Publication of John Wiley & Sons, Jun. 25, 2004.

U.S. Appl. No. 15/191,456, Notice of Allowance dated Dec. 4, 2017, 9 pages.

PCT International Search Report and Written Opinion in International Application PCT/US2017/015536, dated May 11, 2017, 12 pages.

PCT International Search Report and Written Opinion in International Application PCT/US2017/016060, dated May 8, 2017, 17 pgs.

U.S. Appl. No. 15/191,456, Office Action dated Jun. 12, 2017, 21 pages.

* cited by examiner

GENERATING TEMPLATES FROM USER'S PAST DOCUMENTS

CROSS-REFERENCE TO RELATED APPLICATIONS

The present application claims the benefit of U.S. Provisional Application No. 62/289,509, filed Feb. 1, 2016, and is also a continuation-in-part of U.S. application Ser. No. 15/191,456, filed Jun. 23, 2016, now U.S. Pat. No. 9,922,022, the disclosures of which are hereby incorporated by reference in their entireties.

BACKGROUND

Word processor users are often expected to author documents pursuant to guidelines such as those provided by supervisors or instructors. However, blank document templates provided by default by word processor platforms typically do not match these guidelines. Moreover, it is typically too complicated for users to modify the default document templates. Users instead use an existing document they previously drafted as a starting point. The users modify the existing document by editing out or rearranging content. The users also modify the formatting in order to comply with the guidelines. The users then draft a new document by adding text to the modified document that previously existed.

Oftentimes the structure within several documents is unique to a particular user or to a group of users. For example, a user may be a college student whose professor has requirements around the formatting of work for a class. For each new assignment, the user may start out by fine tuning the formatting to match the particular class's requirements. The user may either start with a blank document and set up the formatting or use a previous assignment as a template in an attempt to have consistent formatting.

Or, as another example, a user may produce legal documents that have a specific structure and may include boilerplate language that is shared between documents. When creating a new document, the user may cut and paste portions of an existing document into the new document. Setting up each new document with individual attributes or manually assembling documents from existing documents can be tedious, time consuming, and can be prone to human error. Also, additional processing steps are required by a computing device to format each new document according to a user's input.

A template is a pre-constructed document type that includes various composition elements, such as a collection of styles, formatting settings, and content such as text. When opened in an application such as a word processor, a template creates a copy of itself, into which users can input their own information in lieu of repeatedly creating a new document with the various composition elements. An assortment of pre-constructed templates may be preinstalled with an application or may be available for download. In some applications users create and save custom templates which can be used for authoring future documents.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

To improve efficiency of computing devices and improve the user experience thereon when creating documents, the systems, methods, and computer storage media disclosed herein provide generation of a document template based on clustering of documents with similar recognized recurring composition elements. An automated template generation method and system detects composition element patterns or sequences in documents associated with the user, clusters documents based on how similar or dissimilar the sequences in the documents are, and generates and provides the user with one or more useful and relevant document templates, each document template corresponding with a particular cluster of documents, and each document template comprising composition elements consistent with subsets of composition elements used in the previously created documents.

According to one aspect disclosed herein, a computer-implemented method is presented for improving efficiency in a computer device providing a document template relevant to a user. The method disclosed herein includes retrieving a plurality of documents stored in a database, analyzing each document to determine composition elements, and determining a distance between any two documents based on a determined composition element of the two documents. The documents are then grouped together into two or more clusters of documents based on determined distances. A document template is generated that corresponds to a cluster of documents using at least some of the composition elements from the documents of the cluster. The generated document template is displayed within a user interface for selection by a user. The method may also include indexing the composition elements of the documents, analyzing the index to identify trends of composition elements in the documents, and identifying a trend associated with at least some of the plurality of composition elements in the documents of the cluster, wherein the document template includes the composition elements identified in the trend.

According to another aspect disclosed herein, a system for improving efficiency in a computer device providing a document template relevant to a user is provided. The system includes a processor and memory, including instructions, which when executed by the processor are operable to provide an automated template generation system. The automated template generation system includes a document retriever operative to retrieve documents stored in a database, an indexer operative to index composition elements of the retrieved documents, wherein the composition elements include content and formatting elements, a trend analyzer operative to analyze the index to identify trends of composition elements in the documents, a cluster generator operative to determine a distance between any two documents determined from the composition elements identified in a trend and operative to group the documents into two or more clusters of documents based on determined distances, and a template creator operative to create a document template corresponding to a cluster of documents, wherein the document template includes the composition elements identified in the trend. The system may be further operative to determine sequences of composition elements in the two documents, align the sequences between the two documents, and score the aligned sequences, wherein the distance between two documents is based on the score of the aligned sequences. The system may also be further operative to generate a new document template or modify an existing previously generated document template in response to receiving an indication of a selection of the previously generated document template and then the user modifying one or more composition elements of the previously generated document template, wherein the new document template or the modified previously generated document template includes the modified one or more composition elements.

According to yet another embodiment disclosed herein, a computer readable storage device including instructions is provided. The instructions, when executed by a processor, are operable to perform retrieving a plurality of documents stored in a database, analyzing each document to determine composition elements, determining sequences of composition elements in at least two documents, aligning the sequences between the at least two documents, scoring the aligned sequences of the at least two documents, determining a distance based on the score of the aligned sequences of the at least two documents, grouping the at least two documents into a cluster based on determined distances, generating a document template corresponding to the cluster of documents using at least some of the composition elements from the at least two documents of the cluster, and displaying the generated document template within a user interface for selection by a user.

Examples are implemented as a computer process, a computing system, or as an article of manufacture such as a device, computer program product, or computer readable medium. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
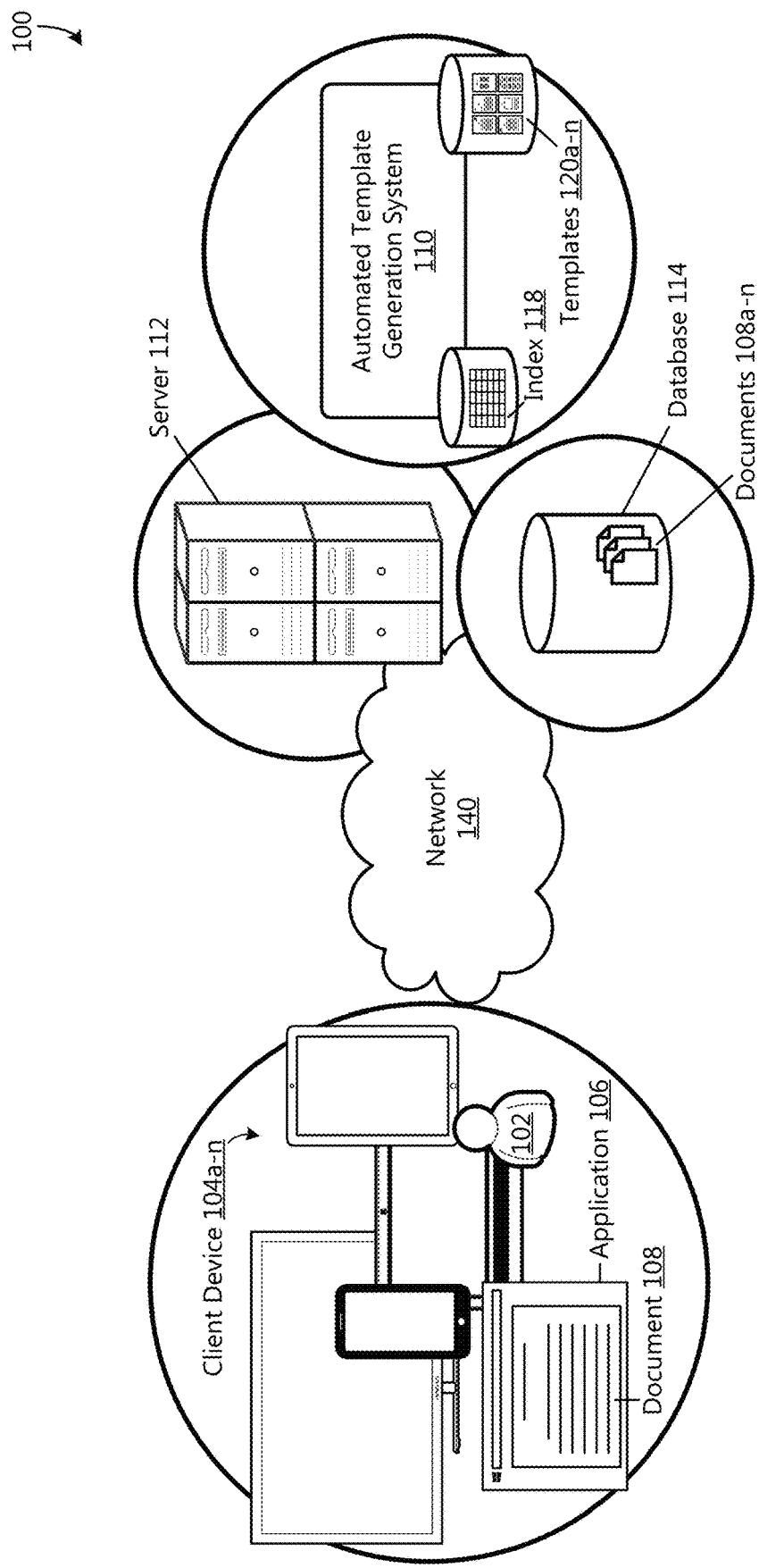
FIG. 1 is an illustration of an example authoring environment in which automated document template generation based on recognized recurring composition elements may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage medium for automated document template generation based on recognized recurring composition elements. FIG. 1 is a block diagram illustrating an example authoring environment 100 in which automated document template generation based on recognized recurring composition elements may be practiced. The example authoring environment 100 includes at least one client computing device 104a-n (collectively, 104), utilized by a user 102, in the form of a desktop computer, laptop computer, tablet computer, handheld computing device, mobile communication device, wearable device, gaming device, and the like.

The example authoring environment 100 includes at least one application 106 executing on the computing device 104. The application 106 may be one of various types of applications or a suite of applications, such as, but not limited to, a word processing application, a spreadsheet application, a slide presentation application, a drawing or computer-aided drafting application, an electronic mail and contacts application, a notes application, and the like. In some examples, the application 106 is a thick client application stored locally on the computing device 104. In other examples, the application is a thin client application 106 (i.e., web application) residing on a remote server (e.g., web application server) accessible over a network 140, such as the Internet, an intranet, a local area network, a wide area network, or combinations thereof. A thin client application 106 may be hosted in a browser-controlled environment or coded in a browser-supported language and reliant on a user agent, such as a common web browser, to render the application 106 executable on the computing device 104.

Further, the application 106 is operative to receive input data including at least a portion of a document 108. The application 106 is also configured to communicate with an automated template generation system 110, illustrative of a software module or system optimized to automatically recognize recurring composition elements in a plurality of stored documents 108a-n associated with the user 102 and to generate and provide one or more document templates 120a-n (collectively, 120) for the user 102 based on recognized recurring composition elements.

Composition elements used in documents 108 are typically unique to a particular user 102 or to a group of users, such as colleagues, students of a same class, etc. For example, typically a user 102 or a group of users create documents 108 that have same or similar composition elements, such as document level formatting (e.g., page layout), text formatting, and portions of content. Accordingly, the automated template generation system 110 is able to detect composition element patterns in documents 108 associated with a user 102 for providing the user 102 a template 120 comprising subsets of composition elements useful to the user 102. Generating a document template 120 based on composition element patterns in documents 108 associated with the user 102 improves the user experience, reduces the use of bandwidth, memory, and processing power to reuse composition elements between documents 108. For example, in lieu of repeatedly creating a new document 108 with the various composition elements preferred or required by the user 102, or in lieu of manually creating a desired template, the automated template generation system 110 automatically provides the user 102 with one or more document templates 120 that are relevant to the user 102. Additionally, providing user-relevant templates 120 helps to ensure consistency across documents 108 created by the user 102. As can be appreciated, providing templates customized specifically to a user's needs reduces rework time; a user is enabled to save time and steps in creating documents 108 from scratch or in reworking existing documents 108, thus reducing the amount of user input and the computing device 104 processing power needed to process the user input.

In some examples, the automated template generation system 110 runs on a server 112. The server 112 is in communication with a database 114 that stores documents 108 from which the automated template generation system 110 builds an index 118 of content blocks from which composition elements are analyzed for identifying recurrence and other trends for automatically creating one or more document templates 120. For example, when a document 108 is authored in a cloud computing environment, such as via a web interface or thin client, the automated template generation system 110 builds an index 118 of content blocks and formatting properties from documents 108 located in the cloud (e.g., stored in a database 114 or memory storage device managed by the server 112), documents 108 located locally to the user (e.g., stored in a database 114 or memory storage device managed by the computing device 104), and documents 108 located on devices part of a local or enterprise network in communication with the computing device 104 (e.g., stored in a database 114 or memory storage device managed by a different computing device 104 or a local or enterprise server, such as a document management system).

The server 112 may be located remotely from the local network of the computing device 104, for example, as a cloud server, in which case the network 140 represents the Internet or a Virtual Private Network (VPN) or other direct data link. The server 112 may also be located as part of the local network of the computing device 104, in which case the network 140 represents a Local Area Network (LAN) or private distributed network for an entity (e.g., a company, a university, a government agency). The automated template generation system 110 is provided by the server 112 to authorized users and receives communications over the network 140 to build the index 118 and create and provide document templates 120 relevant to those authorized users 102.

Figure 2:
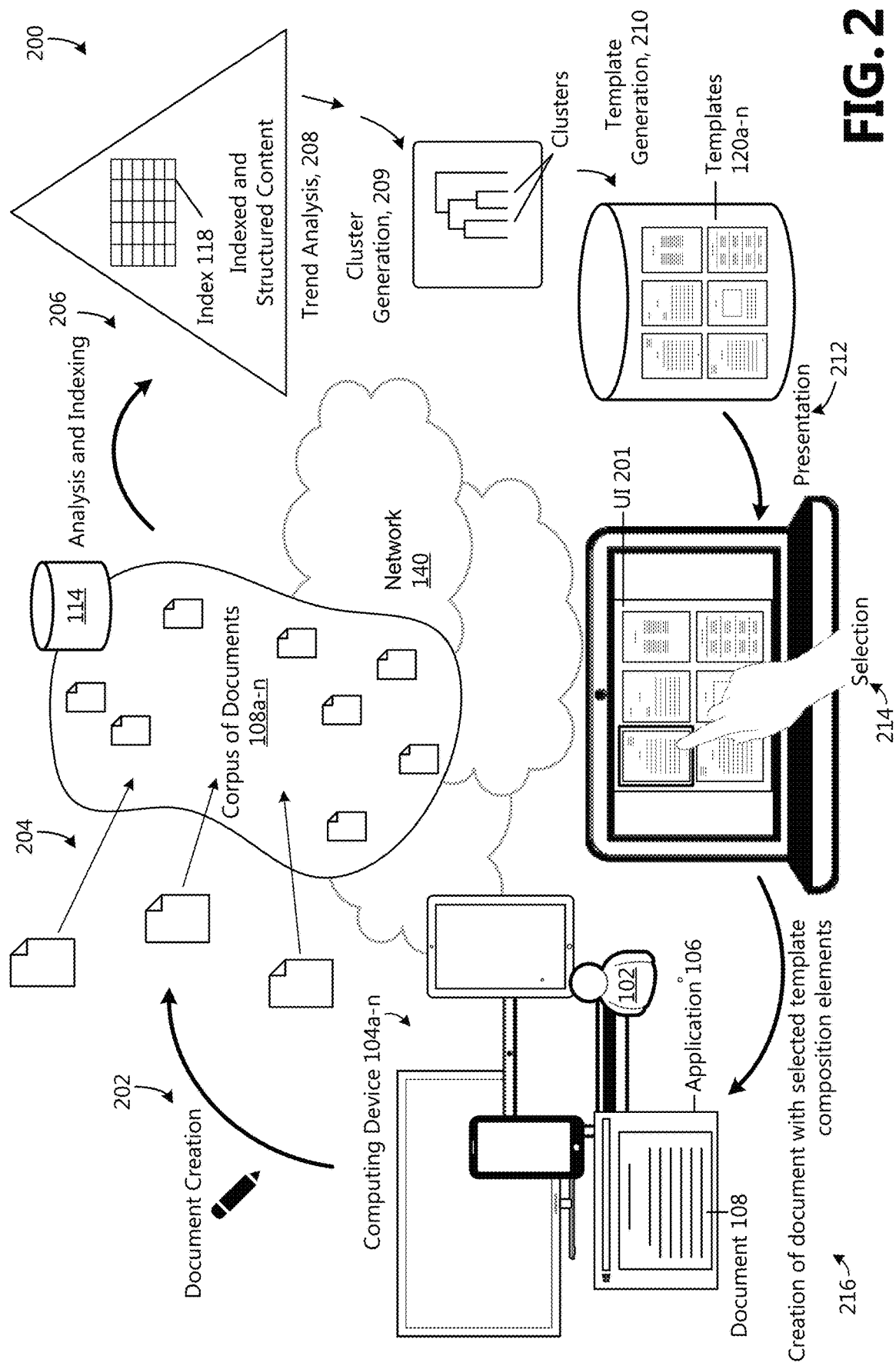
FIG. 2 is a graphical representation of a flow of data in an example method for automated document template generation based on recognized recurring composition elements.

With reference now to FIG. 2, a graphical representation of a flow of data 200 in an example method for automated generation of a document template 120 based on recognized recurring composition elements in an example authoring environment is illustrated. The example flow of data 200 begins at 202, where the computing device 104 receives input from the user 102 for creating a document 108. For example, the user 102 may interact with and modify content and formatting elements by adding, removing, repositioning, or otherwise modifying content or formatting properties of the document 108. Content or formatting properties may be added, removed, or modified via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence.

The example flow of data 200 continues to 204, where the document 108 is stored in the database 114. In some examples, the database 114 is located locally to the user (e.g., a database 114 or memory storage device managed by a computing device 104). In other examples, the database 114 is located on devices that are part of a local or enterprise network in communication with the computing device 104 (e.g., a database 114 or memory storage device managed by a different computing device 104 or a local or enterprise server, such as a document management system). In yet other examples, the database 114 is located in the cloud (e.g., a database 114 or memory storage device managed by a server 112). As will be appreciated, the server 112 and the database 114 may be part of a distributed system, and composed of a multitude of individual computing systems, and multiple client devices 104 may be in communication with the automated template generation system 110 for automated document template 120 generation based on recognized recurring composition elements.

The example flow of data 200 continues to 206, where the automated template generation system 110 intelligently scans a corpus of documents 108 associated with the user 102, and recognizes trends and patterns of composition elements of the corpus of documents 108. According to aspects, the corpus of documents 108 is stored in the database 114. In some examples, the user 102 or the automated template generation system 110 may designate databases 114 or portions of databases 114 from which documents 108 may be drawn, and may also designate specific documents. For example, a user 102 or the automated template generation system 110 may designate an associated online storage service, such as ONEDRIVE® cloud storage solution available from MICROSOFT CORPORATION of Redmond, Wash., as the database 114. The user 102 or the automated template generation system 110 may also designate a hard drive, folder, or file local to the computing device 104 or connected to the network 140 as the database 114.

The user 102 or the automated template generation system 110 may also designate cloud or local storage associated with the user 102 or a colleague of the user 102 as the database 114. For example, the automated template generation system 110 may utilize a search and discovery service, such as the DELVE™ management tool, also available from MICROSOFT CORPORATION of Redmond, Wash., to discover connections between persons in an organization and locate files, folders, and drives of colleagues of the user 102 to analyze for identifying recurrence and other trends for automatically creating one or more document templates 120.

According to various aspects, the automated template generation system 110 is operative to intelligently scan the corpus of documents 108, and index the document content, content formatting, and document level formatting. For example, the automated template generation system 110 builds an index 118 of content blocks, formatting properties, and page layout properties. In some examples, the automated template generation system 110 reads markup language tags, such as Extensible Markup Language (XML) tags to distinguish a position or a level (e.g., heading, header, body, footer, footnote, endnote) associated with content within the document 108.

The example flow of data 200 continues to 208, where the automated template generation system 110 analyzes the index 118 for identifying trends in document content or in formatting properties. In some examples, the automated template generation system 110 applies structural, statistical, and linguistic techniques to discern types of content and relationships between content and the structure of the documents 108. According to an aspect, the automated template generation system 110 identifies subsets of composition elements in documents 108. For example, several documents 108 may have consistently formatted headings, consistent pieces of content, but inconsistently formatted page numbering. The automated template generation system 110 is operative to identify the consistent composition trends (e.g., formatting of headings, pieces of content). In some examples, the automated template generation system 110 analyzes and compares other information associated with the documents 108 with identified matching composition elements to prioritize subsets of identified composition elements. For example, the other information may include an age factor based on the age of the document(s) 108, or a relevancy factor based on the relationship of the author to the user 102 (e.g., when analyzing documents 108 of a user's colleagues).

Figure 3:
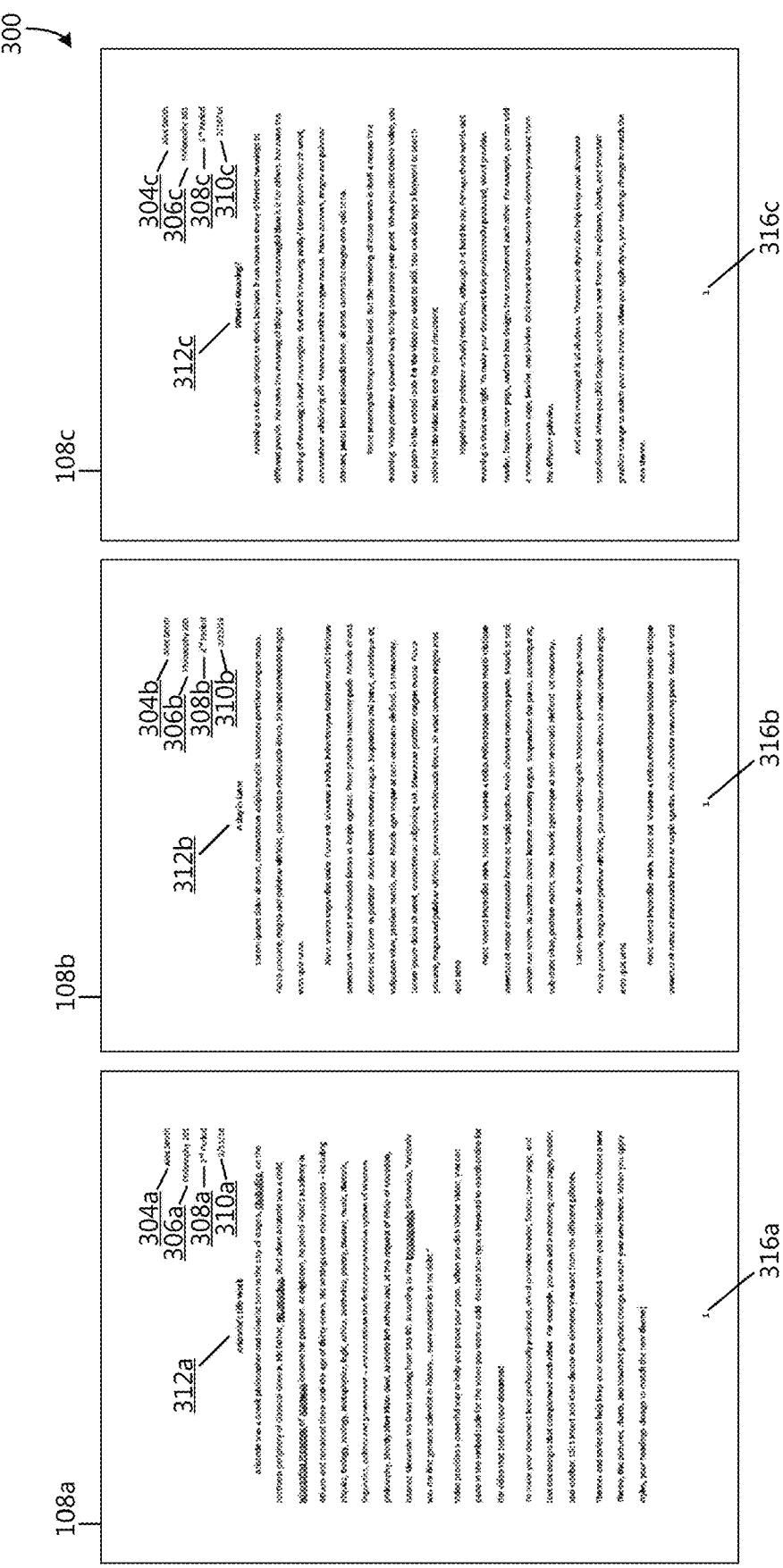
FIG. 3 is an illustration showing example documents from which the automated template generation system recognizes recurring composition elements for generating a document template.

As an example and with reference to FIG. 3, a particular user 102, Alex Smith, is a student whose coursework includes writing numerous papers (i.e., documents 108*a-c*). Each of his teachers may have different requirements around the formatting of work. For example and as illustrated in FIG. 3, a teacher of a first class, Philosophy 201, may require his/her students to include a right-justified heading on assignments including the student's name 304, the class 306, the class period 308, and the date 310. The teacher may also require for each paper to be double-spaced, left-justified, and have one-inch margins, include a title 312 centered and in bold lettering, and to include page numbers 316 centered and at the bottom of the page. Teachers of other classes may have different requirements.

For the first couple of papers (i.e., documents 108) Alex (i.e., user 102) writes for his classes, he may start out creating each new paper (i.e., document 108) by adjusting the formatting to match the particular class's requirements. Alex (i.e., user 102) may also use certain formatting properties and styles that he personally prefers to use, such as a certain typeface. As Alex (i.e., user 102) creates papers (i.e., documents 108), and as the papers are stored in the database 114, the automated template generation system 110 scans and indexes the contents and formatting properties of the papers (i.e., documents 108). The automated template generation system 110 then performs an analysis of the index 118, and identifies matching subsets of composition elements between the documents 108.

With reference still to the illustrated example 300 in FIG. 3, the automated template generation system 110 identifies that three documents 108*a,b,c* authored by Alex (i.e., user 102) include matching portions of content. For example, the automated template generation system 110 identifies the same text "Alex Smith" (i.e., name 304*a,b,c*) on a first line of the three documents 108*a,b,c*, the same text "Philosophy 201" (i.e., class 306*a,b,c*) on a second line of the three documents 108*a,b,c*, and the same text "$3^{rd}$ Period" (i.e., class period 308*a,b,c*) on a third line of the three documents 108*a,b,c*. The automated template generation system 110 further identifies a <date> tag (i.e., date 310*a,b,c*) on a fourth line of the three documents 108*a,b,c*. The <date> tag may be inserted by the user 102, may be automatically inserted by the application 106 used to author the document(s) 108 upon understanding that the type of data the user is entering is a date 310, or may be identified and automatically inserted by the automated template generation system 110 while indexing or analyzing. The automated template generation system 110 further identifies the same formatting properties (e.g., right justification, double spacing) associated with the matching content in the three documents 108*a,b,c*.

Continuing with the example, the automated template generation system 110 identifies that the three documents 108*a,b,c* authored by Alex (i.e., user 102) further include additional matching composition elements. For example, the automated template generation system 110 identifies a title heading 312*a,b,c* in the three documents 108*a,b,c* that includes varying textual content, but that have a same formatting style (e.g., centered, bold, 12 pt font). The automated template generation system 110 further identifies additional matching composition elements, such as page layout, alignment, spacing, margins, indentions, page numbering, typeface, etc.

With reference again to FIG. 2, the example flow of data 200 continues to 209, where the automated template generation system 110 groups of documents into two or more clusters based on similarities of the composition elements between them. A metric or distance function is a function that defines a distance between each matching pair of composition elements of two documents. For example, a similarity matrix is calculated among all composition elements or styles present in the group of documents. The composition elements are converted to numeric values and transformed using a data transformation function to create a standardized input for generating the similarity matrix.

When a set of matching composition elements across a plurality of documents 108 is recognized, the example flow of data 200 continues to 210, where the automated template generation system 110 generates one or more document templates 120 based on the recognized composition element set. According to examples, a template 120 is a pre-constructed file that includes various composition elements, such as a collection of styles, formatting settings, document level formatting settings, and content on which a new document 108 can be based. According to an example, the automated template generation system 110 is operative to build a template 120 using XML tags to give the content or formatting elements in the recognized set of matching composition elements various structural and relationship meanings according to a schema. The automated template generation system 110 is operative to distinguish the content or formatting elements included in the document template 120 and the positions or levels (e.g., heading, header, body, footer, footnote, endnote) associated with content or formatting elements within the document template 120 according to the documents 108 from which the composition elements were identified.

Figure 4A:
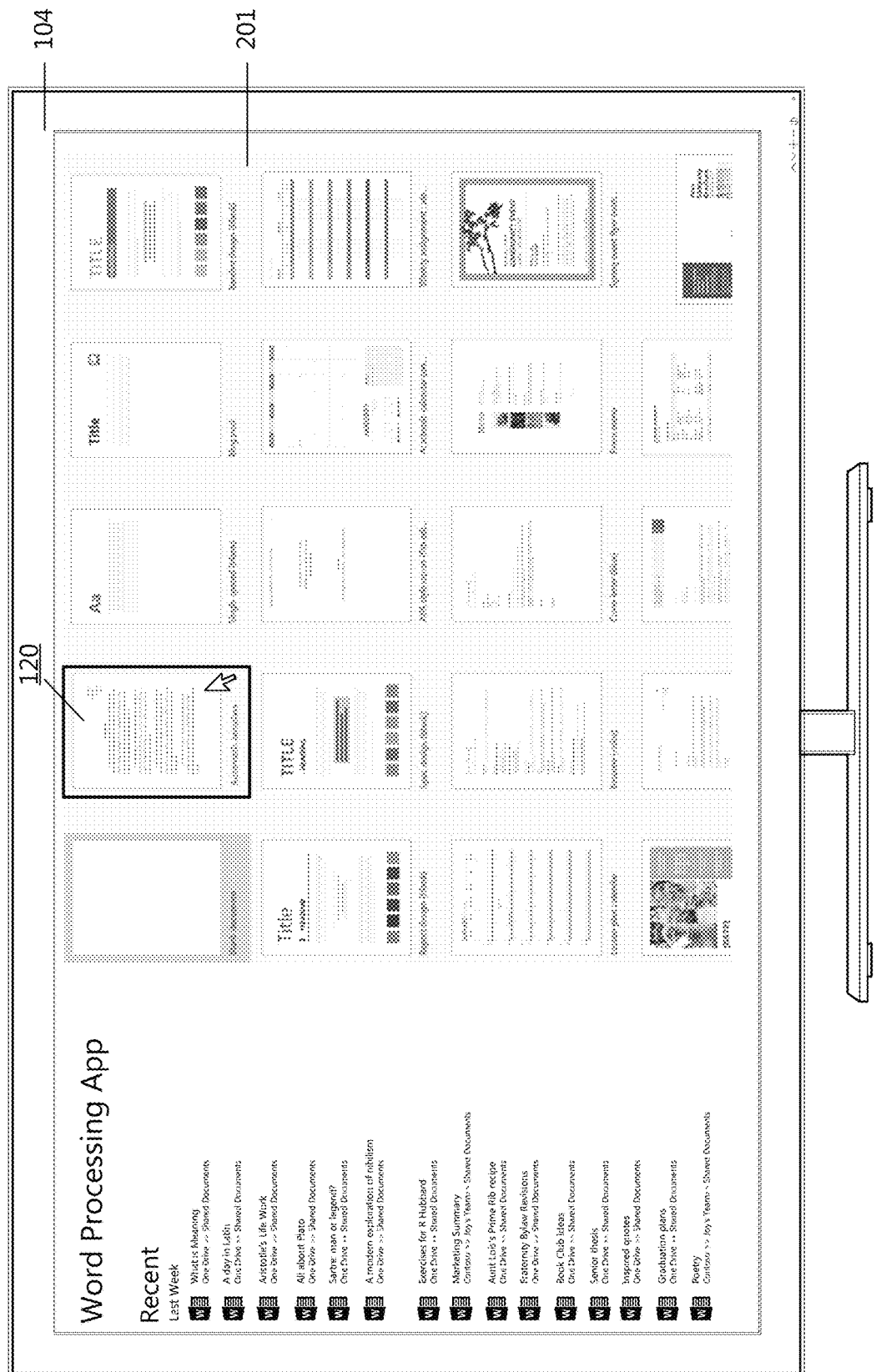
FIG. 4A is an illustration showing a user interface for displaying an automatically generated document template on an example computing device.
Figure 4B:
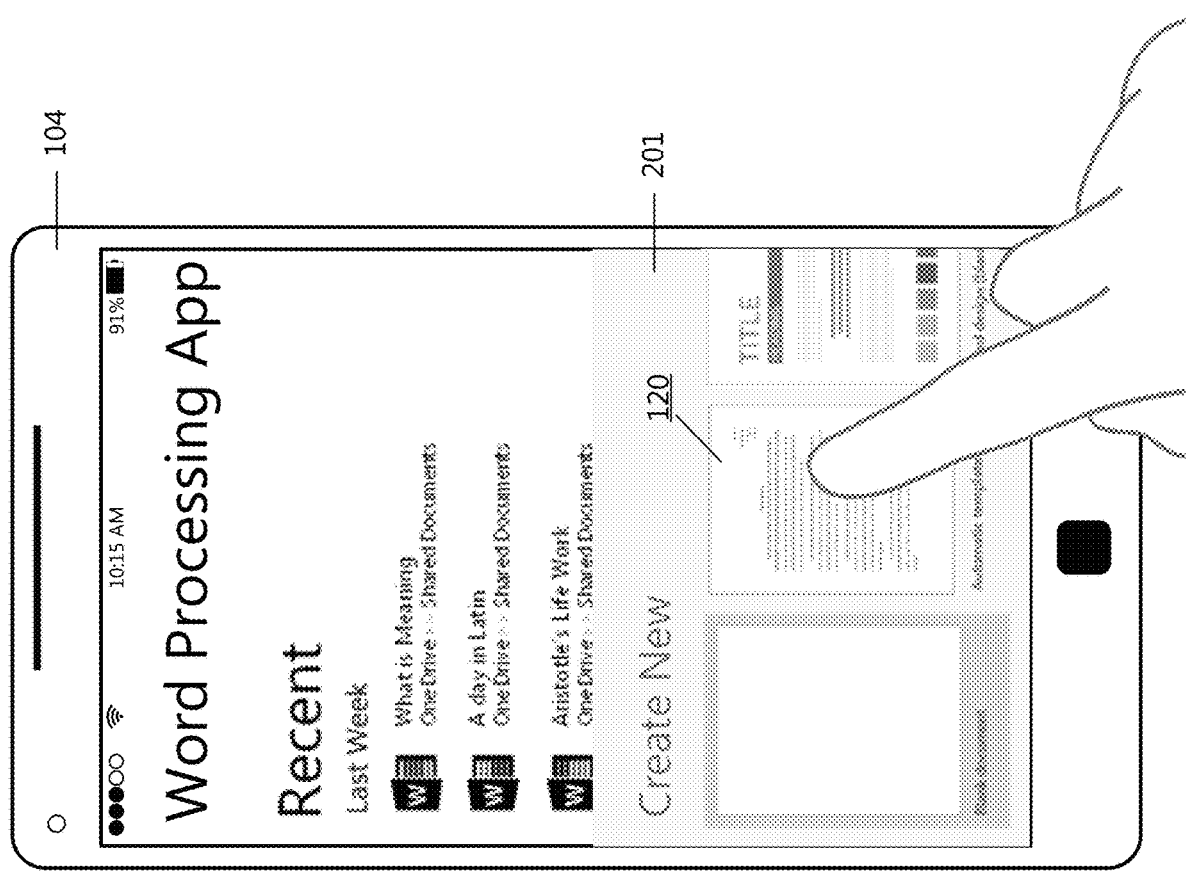
FIG. 4B is an illustration showing a user interface for displaying an automatically generated document template on another example computing device.

The example flow of data 200 continues to 212, where the automated template generation system 110 provides generated document templates 120 to the user 102. For example, the application 106 generates a user interface (UI) 201 for displaying automatically generated document templates 120, in addition to any other pre-existing templates to the user 102. According to an example, when a user 102 opens an application 106 on a computing device 104, the automatically generated document templates 120, in addition to any other pre-existing templates, are exposed to the application 106, for example, via an application programming interface (API) call. Example UIs 201 displayed on example computing devices 104 are illustrated in FIGS. 4A and 4B. In some examples, an image of one or more documents 108 of the plurality of documents 108 from which the subset of composition elements selected to be included in the automatically generated document template 120 may also be displayed to the user.

With reference again to FIG. 2, the example flow of data 200 continues to 214, where the user 102 selects the automatically generated document template 120 from the UI 201. For example, the selection of the automatically generated document template 120 may be received via mouse selection, keystroke entry, touch screen entry, voice or other audio entry, gesture entry, etc.

The example flow of data 200 continues to 216, where a new document 108 is created based on the composition elements included in the selected automatically generated document template 120. For example, when a user 102 creates a new document 108, the application 106 bases the new document 108 on a template 120. If the user 102 does not specify a particular template 120 when creating a new document 108, or if the user 102 uses a blank document template, the new document 108 is based on a default template including default settings such as font, font size, content of a file, etc. Upon selection of an automatically generated document template 120, the document 108 inherits the composition elements that exist in the selected template 120. As described above, by providing an automatically generated user-relevant document template 120, the user 102 is enabled to save time and steps in creating documents 108 from scratch or in reworking existing documents 108, thus reducing the amount of user input and the computing device 104 processing power needed to process the user input. Additionally, consistency across documents 108 created by the user 102 is ensured.

According to an aspect, when a document template 120 is selected and is used for creating a new document 108, the user 102 may modify some of the composition elements of the template. For example, the user 102 may modify content, content formatting, or document level formatting. Accordingly, in some examples, the modifications of the composition elements may be indexed and analyzed. When a trend is identified, such as when the user 102 makes the same modifications to composition elements of a given template 120, the automated template generation system 110 is operative to modify the template 120 or generate a new template 120 based on the identified trend.

Continuing with the example described above of the papers (i.e., documents 108) created by the student Alex (i.e., user 102), a document template 120 may be automatically created for Alex based on an identified subset of composition elements consistent across a plurality of documents 108 created by Alex. The automatically generated document template 120 is displayed to Alex (i.e., the user 102) in a UI 201, such as the example UIs illustrated in FIGS. 4A and 4B. Upon selection of the automatically generated document template 120, a new document 108 is created, wherein the new document 108 inherits the composition elements existing in the selected automatically generated document template 120.

Figure 5:
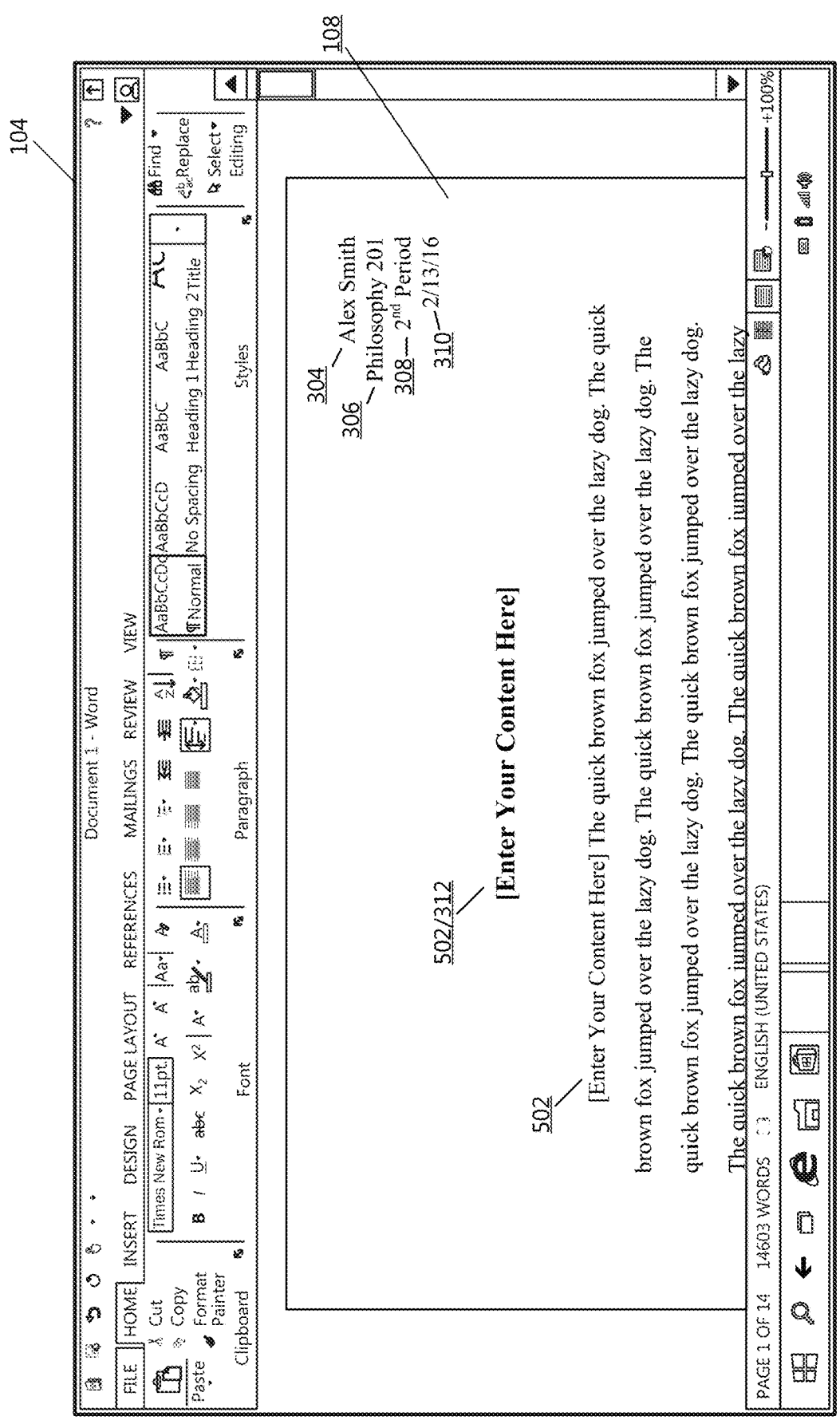
FIG. 5 is an illustration showing an example document created based on an automatically generated document template.

With reference to FIG. 5, an example of a new document 108 comprising various composition elements existing in an automatically generated document template 120 for Alex based on the identified subset of composition elements consistent across a plurality of documents 108 created by Alex is illustrated. Examples of a subset of composition elements inherited by the new document 108 include various pieces of content, such as the text "Alex Smith" (i.e., name 304) on the first line the document 108, the text "Philosophy 201" (i.e., class 306) on the second line of the document 108, and text "$3^{rd}$ Period" (i.e., class period 308) on the third line of the document 108. The example subset of composition elements identified by the automated template generation system 110 further includes a <date> tag (i.e., date 310) on the fourth line of the document 108, and various placeholders 502, such as a placeholder for the title heading 312 and a placeholder 502 for a portion of textual content in the body of the document 108. For example, when the automated template generation system 110 identifies matching formatting elements, but varying content associated with a data element, the automated template generation system 110 is operative to insert a placeholder 502 that includes the identified matching formatting properties and an input area into which the user is enabled to input different content. For example, the placeholder 502 for the title heading 312 includes the formatting properties (e.g., centered, bold, 12 pt font) of the title headings 312$a,b,c$ of the documents 108$a, b,c$ illustrated in FIG. 3. Other example placeholders 502 may include a picture placeholder, a table placeholder, a graph placeholder, and the like. The example subset of composition elements identified by the automated template generation system 110 and included in the example document 108 based on the automatically generated document template 120 further includes other formatting properties, such as alignment, spacing, margins, indentions, page numbering, etc. As should be appreciated, the examples illustrated with respect to FIGS. 3-5 and described above are exemplary, and are not limiting of the aspects and examples of the automated template generation system 110.

Figure 6:
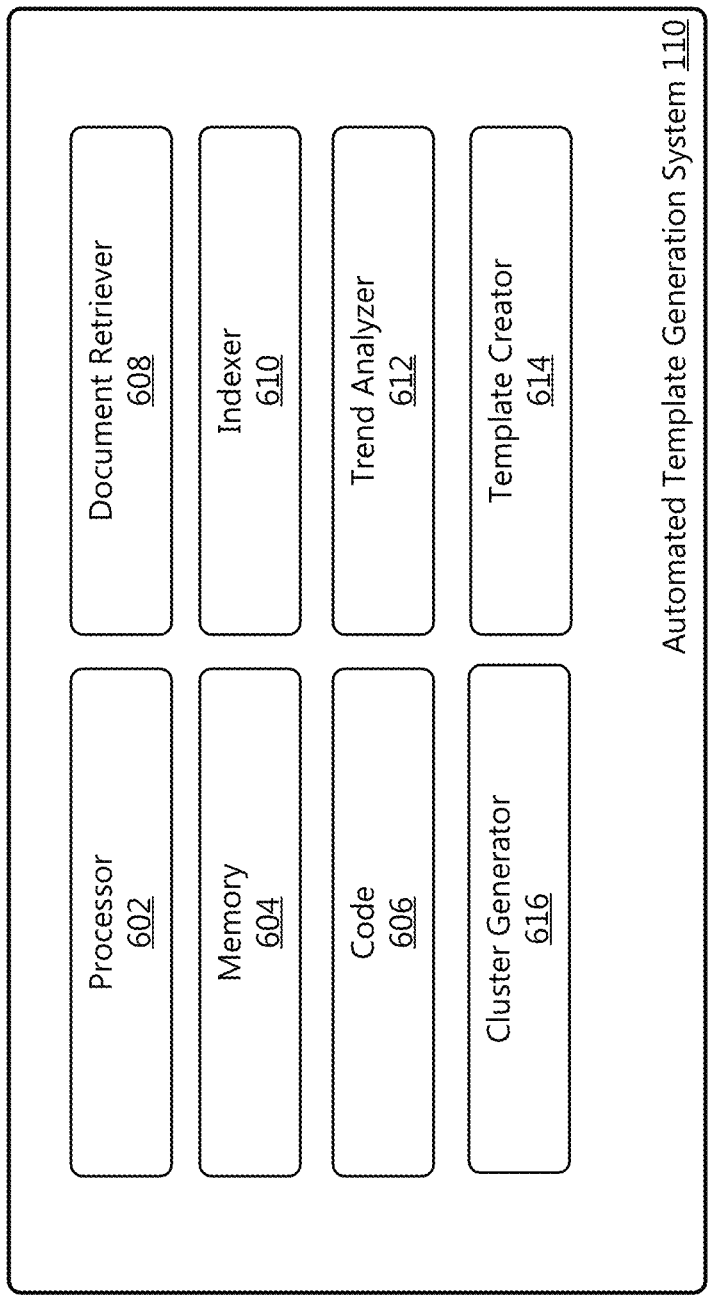
FIG. 6 is a block diagram illustrating components of an example automated template generation system.

With reference now to FIG. 6, a block diagram of various components of an example automated template generation system 110 is illustrated. According to examples, the automated template generation system 110 includes at least one processor 602 and memory 604 storing code 606, which is executable by the processor 602 to cause a document retriever 608 to retrieve documents 108 from the database 114, an indexer 610 to extract and index content and formatting elements extracted from the retrieved documents 108, a trend analyzer 612 to recognize trends and patterns of recurring composition elements amongst documents 108 associated with a user 102, a cluster generator 616 to group similar documents into clusters based on a similarity matrix, and a template creator 614 to build a document template 120 using a recognized subset of composition elements, which can include content elements, formatting elements (e.g., including document level formatting elements), or a combination of content elements and formatting elements.

The document retriever 608 is illustrative of a software module, system, or device operative to retrieve documents 108 from the database 114. As described above, the database 114 stores a corpus of documents 108. In some examples, the database 114 is located locally to the user (e.g., a database 114 or memory storage device managed by a computing device 104). In other examples, the database 114 is located on devices that are part of a local or enterprise network in communication with the computing device 104 (e.g., a database 114 or memory storage device managed by a different computing device 104 or a local or enterprise server, such as a document management system). In yet other examples, the database 114 is located in the cloud (e.g., a database 114 or memory storage device managed by a server 112).

In some examples, the document retriever 608 is operative to retrieve specific documents 108. In other examples, the document retriever 608 is operative to retrieve documents 108 stored in specific databases 114 or portions of databases 114. In some examples, the document retriever 608 is operative to retrieve documents 108 from a hard drive, folder, or file local to the computing device 104 or connected to the network 140 as the database 114. The document retriever 608 may retrieve batches of documents 108, or may retrieve a single document 108.

The indexer 610 is illustrative of a software module, system, or device operative to intelligently scan the documents 108 retrieved by the document retriever 608, discover and extract composition elements (e.g., content, content formatting elements, and document level formatting elements) from the documents 108, and index the composition elements in an index 118.

The trend analyzer 612 is illustrative of a software module, system, or device operative to analyze the index 118 for making comparisons, identifying trends and patterns of recurring composition elements amongst documents 108 associated with a user 102, and determining meaningful subsets of composition elements for building a document template 120 that is relevant and useful to the user 102. For example, the trend analyzer 612 is operative to identify recurring inclusion of specific content (e.g., textual content, an understood string type, images, tables, graphs) in a plurality of documents 108, recurring use of specific formatting properties, including content formatting and document-level formatting (e.g., alignment, spacing, margins, indentions, page numbering, headers, footers, columns, typeface, font size) in a plurality of documents 108, and combinations of content and formatting properties.

The cluster generator 616 is illustrative of a software module, system, or device operative to group documents into clusters of documents based on similarities between the documents as explained in greater detail below.

The template creator 614 is illustrative of a software module, system, or device operative to build a document template 120 from relevant documents, clustered by the cluster generator 616, having a meaningful subset of composition elements identified by the trend analyzer 612. When a plurality of subsets is identified, the template creator 614 is operative to build multiple document templates 120. In some examples, the template creator 614 builds templates 120 using XML tags to give the content or formatting elements in the recognized set of matching composition elements various structural and relationship meanings according to a schema.

Figure 7A:
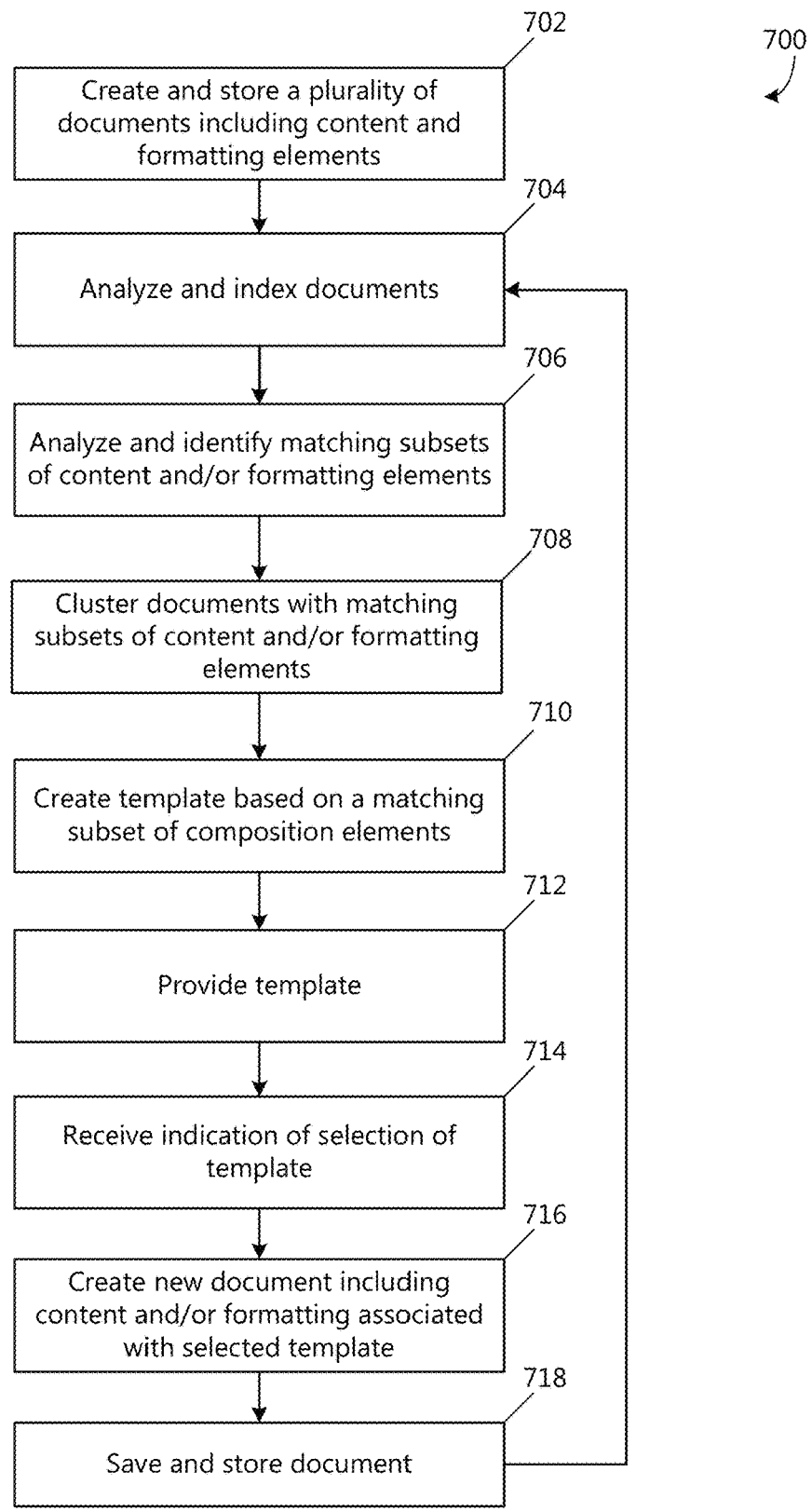
FIG. 7A is a flow chart showing general stages involved in an example method for automated document template generation based on composition elements.

FIG. 7A is a flow chart showing general stages involved in an example method 700 for automated document template generation based on recognized recurring composition elements. With reference now to FIG. 7A, the method 700 begins at OPERATION 702, where a user 102 of a computing device 104 uses an application 106 for creating a plurality of documents 108 and storing the documents 108 in a database 114. The plurality of documents 108 includes various pieces of content and various formatting elements. The creation of each of the plurality of documents 108 may occur at different times over a period of time. Documents 108 may include word processing documents, spreadsheets, slide presentation documents, email documents, note-taking documents, and the like.

The method 700 proceeds to OPERATION 704, where the document retriever 608 retrieves documents 108 from the database 114, and the indexer 610 indexes content and formatting elements of the documents 108 in an index 118. In some examples, the indexer 610 reads markup language tags, such as Extensible Markup Language (XML) tags to distinguish a position or a level (e.g., heading, header, body, footer, footnote, endnote) associated with content and formatting within the document 108 for indexing the content and formatting elements.

The method 700 proceeds to OPERATION 706, where the trend analyzer 612 analyzes the index 118, and identifies matching composition elements between documents 108. The trend analyzer 612 further determines meaningful subsets of composition elements (e.g., content elements, formatting elements) for building a document template 120 that is relevant and useful to the user 102. In at least one aspect, the trend analyzer may emphasize composition elements found in an initial portion of each document and de-emphasizing composition elements found in an end portion of each document.

The method 700 then proceeds to OPERATION 708, documents with similar or matching composition elements, such as subsets of content and/or formatting elements, are clustered together. OPERATION 708 for clustering documents is described in greater detail in FIG. 7B.

Figure 7B:
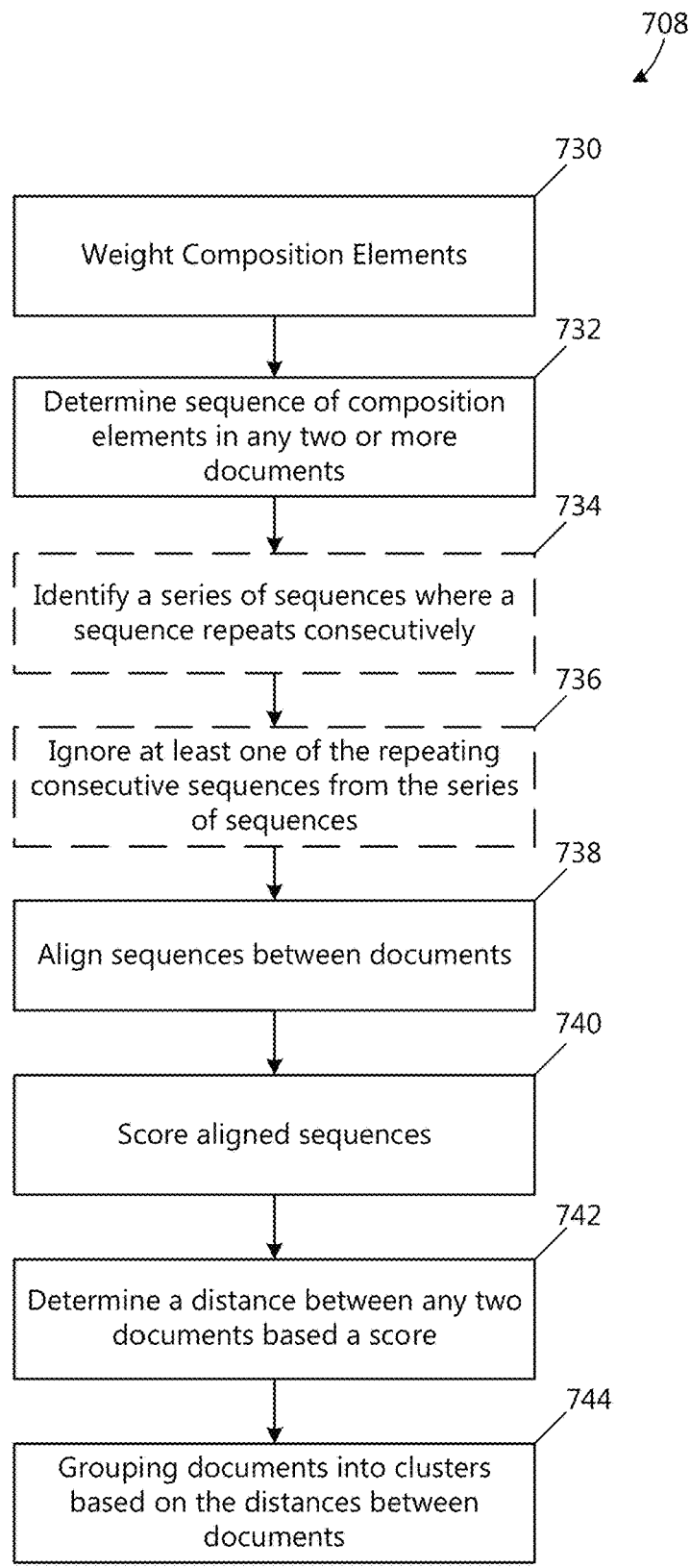
FIG. 7B illustrates a flowchart corresponding with one of the operations of the flowchart of FIG. 7A according to at least one aspect disclosed herein.

FIG. 7B illustrates a flowchart corresponding with the OPERATION 708 of FIG. 7A. At OPERATION 730 the composition elements may be weighted according to each composition element's importance in determining similarity. For example, a set of weights may be used to modulate the importance of each of the style properties in determining similarity between styles. Weights are used to tune the results of the similarity calculations by multiplying into the transformed input data. In another example, higher weight may be assigned to a font size property than to a font color property. The weights may be tuned manually or automatically based on automated feedback as a result of user input.

The transformed and weighted data is then analyzed using the cosine-theta similarity metric, which returns 1 for perfect similarity and 0 for perfect dissimilarity. The inflection point is at $\cos(\pi/4)$ (~0.707) which is the expected similarity of two vectors of random positive numbers (Mather, P. M., Computer Processing of Remotely Sensed Images: An Introduction, $3^{rd}$ Edition, 2004, at 234). The output from the cosine-theta calculation is post-processed to set all values less than $\cos(\pi/4)$ to 0. Any suitable data standardization methods and distance, similarity, and/or divergence metrics could be used to implement the OPERATION 730, and therefore should not be limited to any particular data transformations or similarity determinations.

The method 700 then proceeds to OPERATION 732 for determining sequences of composition elements in any two or more documents. In one or more embodiments, a sequence may refer to a series of composition elements within a document or instead may refer to a series of sequences of a document where each sequence of the series refers to a group of composition elements. From a set of documents that may be of interested to a user, such as documents previously authored by the user, documents read by the user, that may have been shared amongst multiple users, documents directly shared with the user, or documents authored by others, sequences of composition elements may be extracted from each document. In one or more aspects, the document retriever 608 retrieves documents authored by the user as well as documents authored by others and shared with the user.

Once a set of relevant documents is determined, each document is then analyzed to determine a sequence which specifies values for a set of properties. The set of properties could, for example, include the entire feature set of MICROSOFT WORD or other example word programming application. In another example, a reduced set of properties could include formatting properties such as direct formatting properties including bold, italic, and underlining as well as some paragraph level properties such as text alignment (left, right, center) and outline level properties (heading 1, headlining 2, body text). Also, the text within a sequence is property. In at least one aspect, each document is analyzed to determine a least one of a collection of styles, formatting settings, graphic elements, and text.

In one or more aspects, sequences with identical properties can be combined into a single sequence. In another aspect, sequences with identical properties, other than text and last-in-paragraph properties, can be combined into a single run. In one example, the last sequence in a paragraph is only combined with sequences that precede it that have identical non-text properties and are not the last sequence in another paragraph. Therefore, a paragraph with several identical sequences would not be combined into a single sequence and multiple identical paragraphs will stay separate when treating paragraphs individually is desirable.

The method 700 then may proceed to OPTIONAL OPERATION 734 for identifying a series of sequences where a particular sequence of composition elements repeats consecutively. Documents tend to have repeating patterns of headings and text. Even when using the same template, one student might write a report with a small number of sub-topics (each having its own heading and followed by text) and another different student might write a document with many more sub-topics. However, at the core, both utilize the same template.

For better clustering using sequence matching of documents, individual document sequences may be adjusted to compensate for this. Otherwise, two different documents from the same template might end up getting penalized unnecessarily. Thus, a document's sequences are analyzed to find sequences which repeat back-to-back or consecutively. In one or more aspects, when consecutive sequences are found within a series of sequences, at least one of the consecutive sequences is ignored or removed. In other words, only the first sequence of composition elements is kept while one or more of the remaining consecutively repeating sequences is ignored or removed. For example, when an original sequence of a document (where S=sequence of composition elements and n=number of a sequence within a series) is S1S1S1S2S2S3S2S3S3S2, the original sequence may be reduced to S1S2S3S2S3S2 (S1 S1S1 S2 S2 S3S2S3 S3 S2) by removing one of each of the repeating sequences. Furthermore, the resulting sequence S1S2S3S2S3S2 may be further reduced by again ignoring or removing one of the sequences within a consecutively repeating sequence. For example, S1S2S3S2S3S2 (S1S2S3S2S3S2) may be reduced to S1S2S3S2. Thus, after identifying a series of sequences in a document where a sequence repeats consecutively within the series of sequences, the method 700 may include OPTIONAL OPERATION 736 for ignoring at least one of the repeating sequences of a series of consecutive repeating sequences within a series of sequences of a document.

The method 700 then proceeds to OPERATION 738 for aligning sequences between documents. A dynamic programming matrix may be generated by leveraging the similarity matrix to align a series of sequences in one document with another series of sequence in another document. The best alignment has corresponding series of sequences in each document and, thus, corresponding composition elements. The sequence alignment may be performed using any sequence alignment scheme such as Hidden Markov Model-based sequence clustering techniques or a sequence alignment dynamic programming scheme such as Needleman-Wunsch, Smith Waterman, FASTA, and a Basic Local Alignment Search Tool (BLAST) which are typically used in bioinformatics for aligning nucleotide sequences.

The method 700 then proceeds to OPERATION 740 for scoring aligned sequences. After the sequences have been aligned, the similarity matrix may be used to score the aligned sequences. A distance between documents may be based on the score of the aligned sequences. Exact matches are scored high and inexact matches are penalized where the penalty is contingent on the level of mismatch. Gaps within a sequence or series of sequences are also penalized. In one or more embodiments, an initial match is weighted more than matches towards the end. In another embodiment, exponential weighting may be used wherein the weighting is a function of the length of the series of sequences. Other methods of weighting may also be used.

The method 700 then proceeds to OPERATION 742 for determining a distance between any two documents. After the aligned sequences have been scored, a N×N document distance matrix D is generated where "N" is the number of documents and D(i, j) represents the normalized distance between the $i^{th}$ and $j^{th}$ documents. The documents may be grouped together based on the distance between them. Sets of documents that are close to each other in distance get grouped together into a same cluster.

Figure 7C:
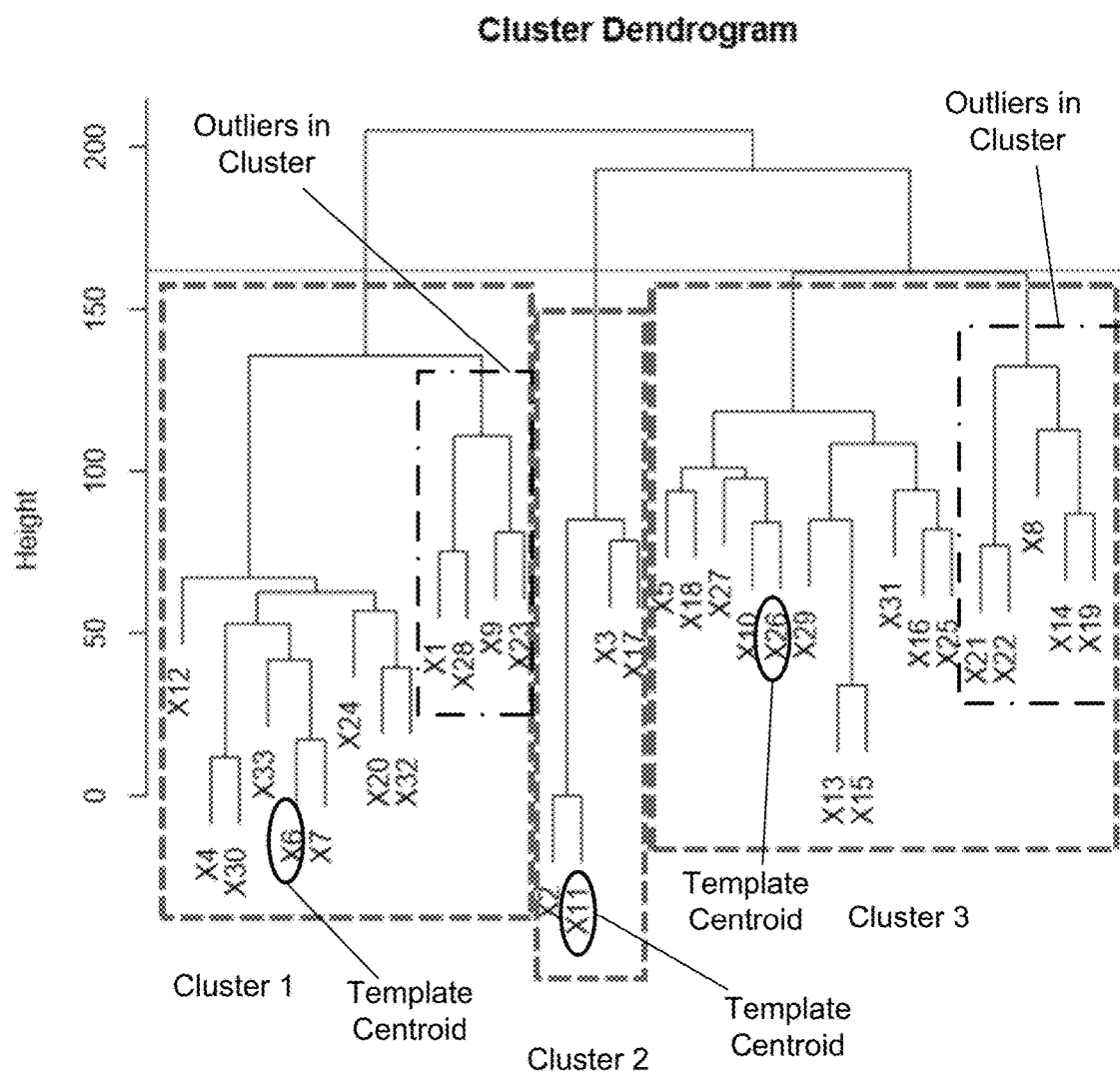
FIG. 7C illustrates one aspect of an example cluster dendrogram used to illustrate an arrangement of clustered documents generated by the example method of FIGS. 7A and 7B.

FIG. 7C illustrates an example of a dendrogram used to illustrate an arrangement of documents in clusters based on similarity. The dendrogram of FIG. 7C depicts three clusters of documents. If trying to identify which documents are most similar to each other, the dendrogram is read from the bottom up and the first documents joined or linked together are most similar. In cluster 1 documents X4 and X30 are joined together first and therefore are most similar to one another in cluster 1. In cluster 2 documents X2 and X11 are most similar and in cluster 3 documents X13 and X15 are most similar.

However, each cluster includes a cluster centroid which is a document determined to have the lowest average distance. Preferably, the documents surrounding the centroid document are selected and kept while the outliers are preferably dropped. The document template corresponding with a particular cluster is preferably derived from the documents surrounding or in proximity of the centroid document. Thus, the method 700 includes the OPERATION 744 for grouping documents into clusters based on distances between documents. From OPERATION 744 the method 700 proceeds to OPERATION 710 as shown in FIG. 7A.

Returning now to FIG. 7A, the method 700 then proceeds to OPERATION 710, where the template creator 614 builds a document template 120 from a meaningful subset of composition elements identified by the trend analyzer 612 and the resulting cluster of documents generated by the cluster generator 616. Output from the document clustering is used to create the document templates. A document template may be generated from each cluster of documents. Beginning with the document with the lowest distance to its respective cluster centroid, a determination is made as to which sequences in the document will be kept, removed or modified in the document template. Similar sequences within the other documents within the particular cluster are identified after outlier removal and tagged as to whether they should be kept, deleted, or whether styles should be kept but text replaced with boilerplate for common styles having different text. The following constructs may be created while looking for similar features across the documents in each cluster:

Unigrams: constructs of style and text—Simply using the first word to identify headings that are common within the document cluster, Styles: common styles within the document cluster are kept and the others removed, and Bigrams: constructs of unigrams (from above) and immediately subsequent style. This construct is useful in identifying sequences of headings followed by block text that are common within the document cluster.

In order to produce useful document templates, the provided document templates are scored. For example, the document templates may be scored as follows: Template Score=(Number of unique styles with at least one placeholder or original text block in template+Number of text runs with exactly similar text). Document templates which attain a particular score or higher could be displayed. In other words, each document template may be scored and only those document templates that score higher than a threshold level are displayed in the user interface. The threshold can be adjusted based on user feedback regarding whether the user likes the document template or not. For example, the score of a document template may be adjusted upward in response to selection of the document template by the user. The score of the document template may also be adjusted downward as a result of the document template not being selected by the user within a particular period of time.

The document template may also be scored in order to sort generated document templates. Sorting should take into consideration usage of previously generated similar document templates.

Thus, at OPERATION 712, one or more documents templates 120 or representations of one or more document templates 120 are displayed in a user interface (UI) 201 on a computing device 104 for selection by a user. The document templates may be saved in cloud storage or elsewhere such that the document templates are available across multiple endpoints. The document templates may be made available on a laptop, desktop, PDA, or other remote device via mobile or tablet applications.

According to an example, when the user 102 opens the application 106 on a computing device 104 to create a new document 108, the application 106 makes a request to the automated template generation system 110 for available templates 120. In response, the automated template generation system 110 provides the available templates 120 or a subset of available templates, including automatically generated user-relevant templates 120, to the application 106 for display in the UI 201. In some examples, the automated template generation system 110 provides representations (e.g., thumbnail or preview images) of the available templates 120 or of a subset of the available templates. According to an aspect, the same templates 120 are available on all of the computing devices 104 the user 102 uses, for example, on mobile devices such as a phone or tablet, or on desktop, laptop, or other types of computing devices used by the user 102.

The method 700 proceeds to OPERATION 714, where an indication of a selection of an automatically generated template 120 is received. For example, the user 102 may use one of various input means (e.g., mouse selection, keystroke entry, touch screen entry, voice or other audio entry, gesture entry) for selecting a desired automatically generated template 120.

The automated template generation system 110 may learn from the user's selections and user preferences. In order to generate high quality document templates it often depends on user and organizational context. In other words, the correct weight has to be given to the various composition elements and style attributes. Thus, self-learning may be used to identify the correct set of weights for each user in an organization context. If a user uses one of the identified document templates to create and save a new document, greater preference is given to those weights. Also, weights identified as preferred by multiple users in the organization may be used as suitable starting weights for another individual user in that organization.

At OPERATION 716, a new document 108 is created based on the composition elements included in the selected automatically generated document template 120. That is, the document 108 inherits the composition elements that exist in the selected template 120. In some examples, the application 106 may make a call to the automated template generation system 110 for the selected automatically generated document template 120 if it were not already received (e.g., if a preview image was sent at OPERATION 712). The user 102 is enabled to start on new documents 108 virtually anywhere, without having to worry about setting up formatting details. For example and with reference back to the example of Alex, when his teacher assigns a next paper, Alex (i.e., user 102) does not have to dig up his course syllabus to find the required formatting requirements; the formatting properties he previously used are automatically provided to him, thus saving time and providing Alex with a better user experience.

At OPERATION 716, the user 102 may add additional content to the document 108. In some examples, if the automatically generated document template 120 includes one or more placeholders 502, the user 102 may input content, and the formatting properties associated with the placeholders 502 are applied to the added content.

The method 700 continues to OPERATION 718, where the document 108 is saved and stored in the database 114. The method 700 may return to OPERATION 706, where the new document 108 is analyzed and indexed. For example, after selecting a previously generated document template 120, the user 102 may make changes to one or more composition elements of the previously generated document template 120, such as changes to content, content formatting, or document level formatting. Accordingly, the user modifications of the composition elements may be indexed and analyzed. In some examples, when a trend is identified, such as when the user 102 makes the same modifications to composition elements of a given template 120, the automated template generation system 110 is operative to modify the document template or generate a new document template based on the identified trend.

The automated template generation system 110 may also analyze the relevance of automatically generated templates 120. For example, the automated template generation system 110 may determine and associate a relevancy score with automatically generated document template 120, such that when a call is made to the automated template generation system 110 for templates 120 available to a given user 102, the most relevant document templates 120 are provided for display in the UI 201.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
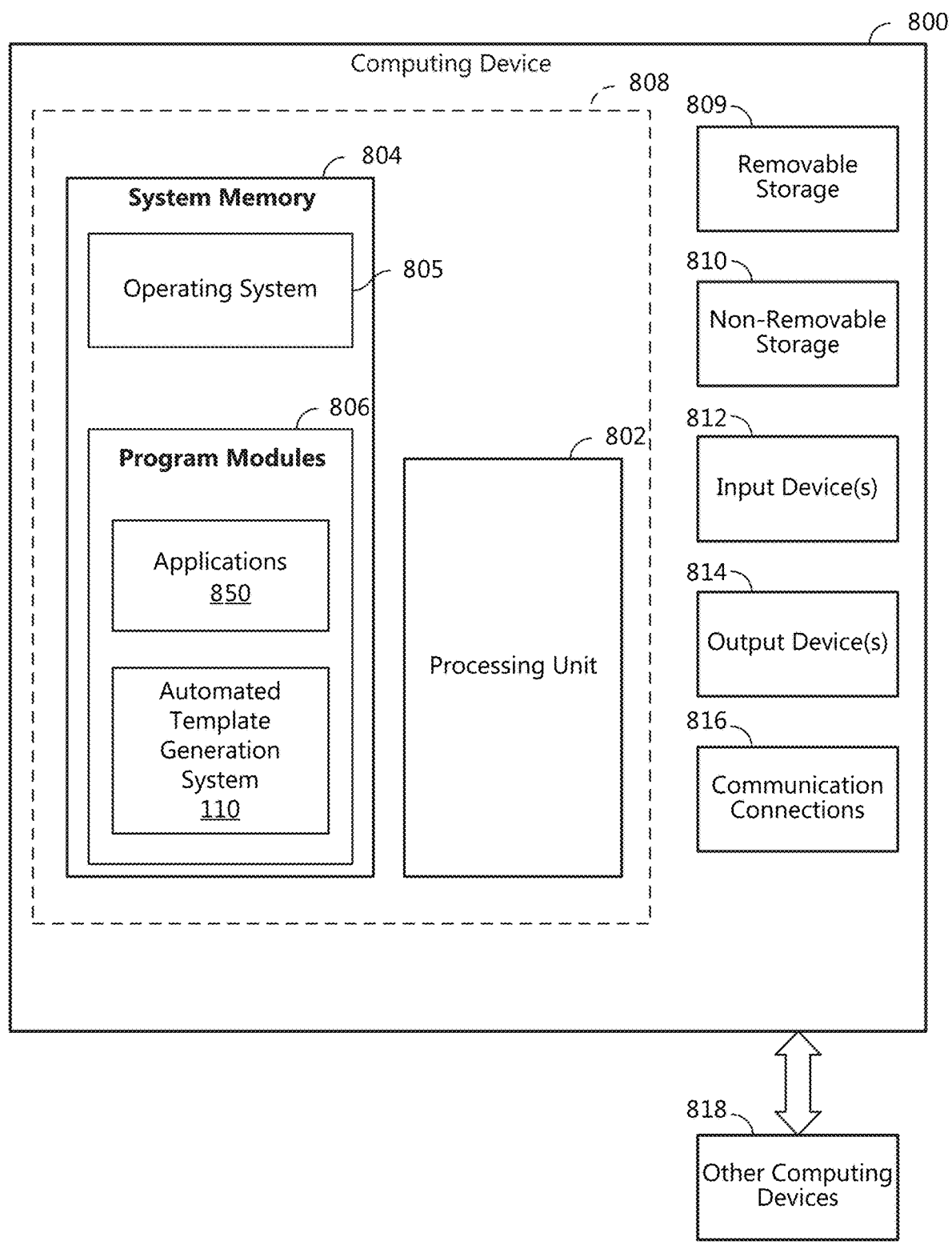
FIG. 8 is a block diagram illustrating example physical components of a computing device.
Figure 9A:
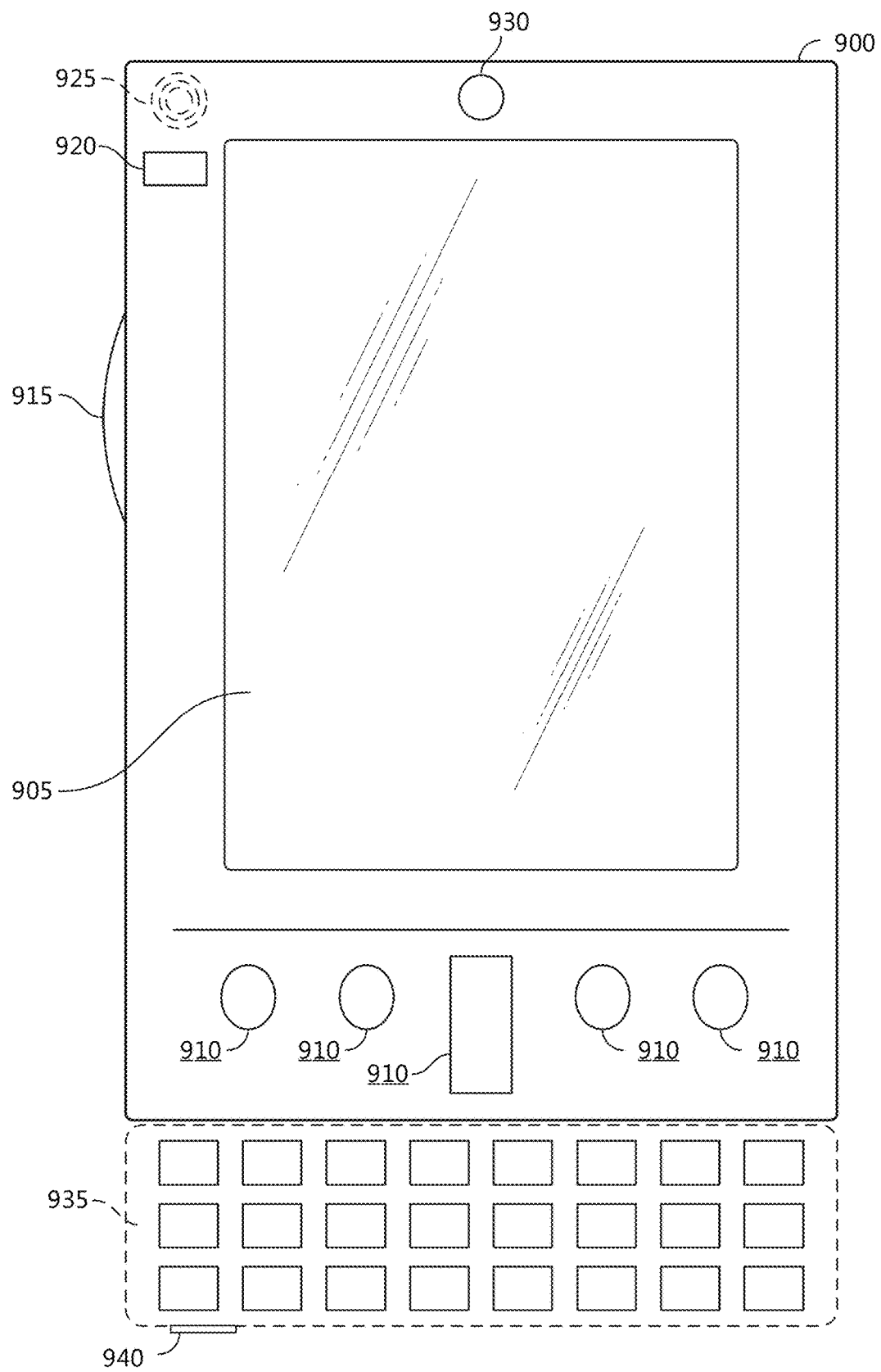
FIGS. 9A and 9B are block diagrams of a mobile computing device.
Figure 9B:
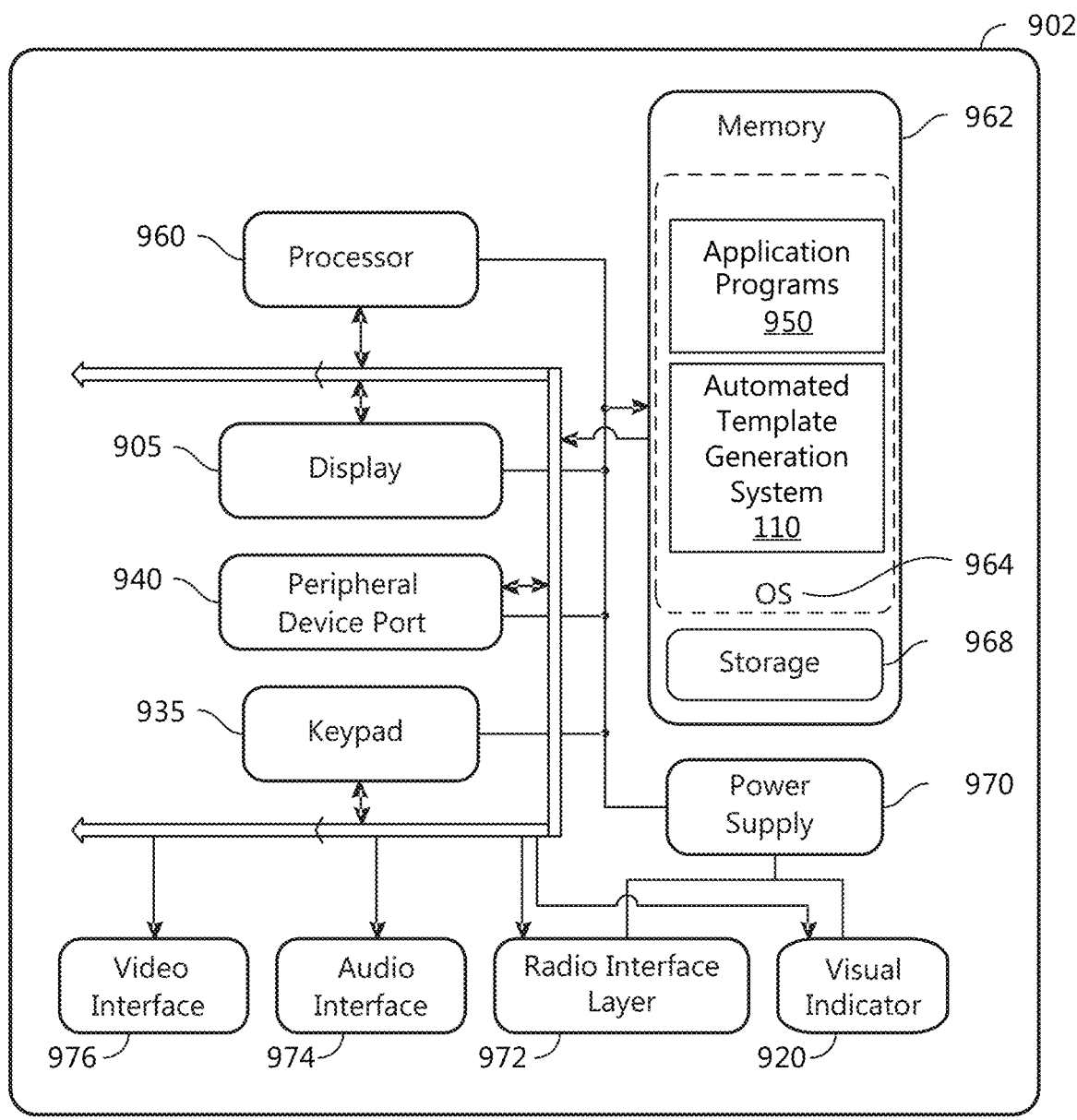
Figure 10:
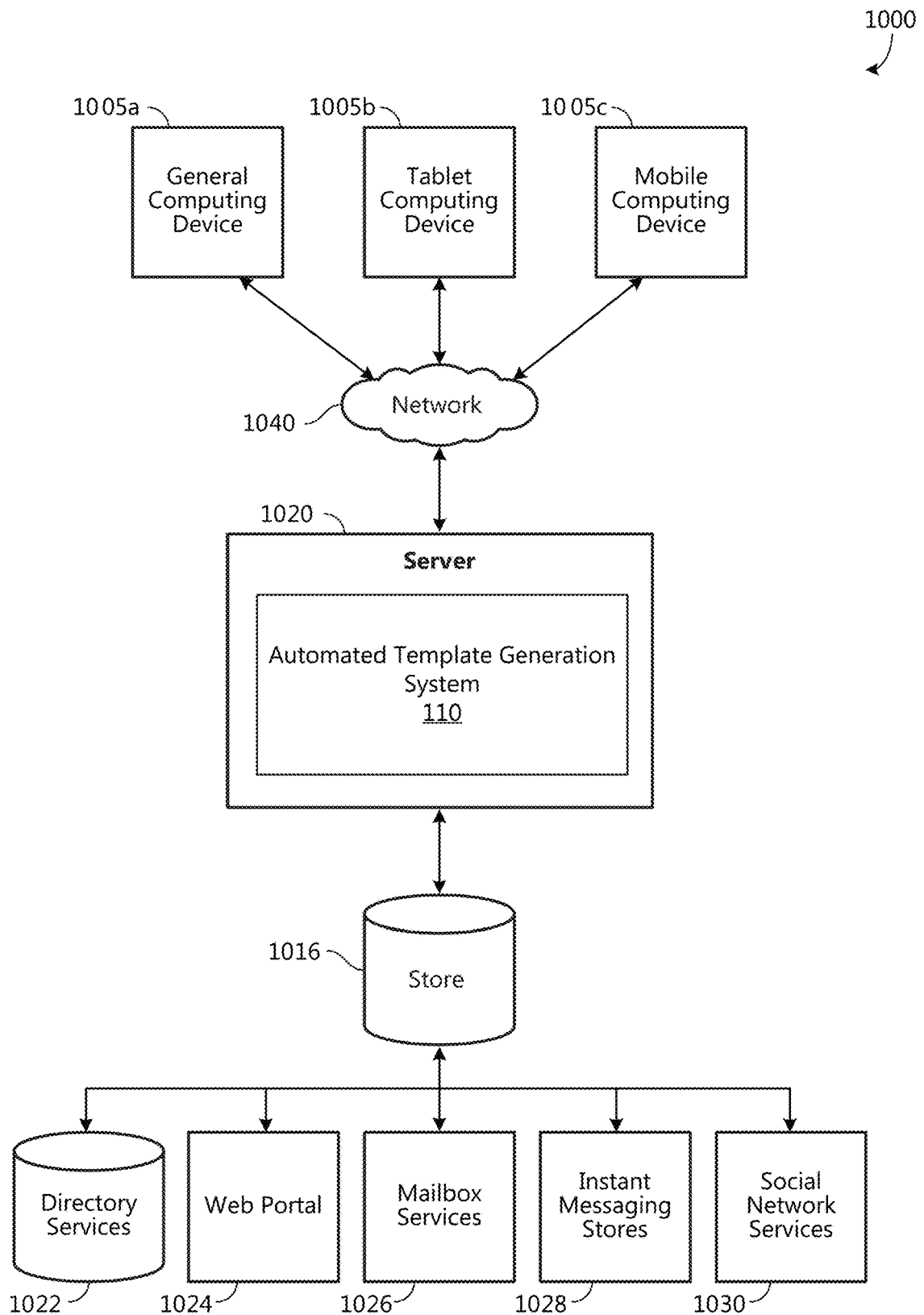
FIG. 10 is a block diagram of a distributed computing system.

FIGS. 8-10 and the associated descriptions provide a discussion of a variety of operating environments in which examples are practiced. However, the devices and systems illustrated and discussed with respect to FIGS. 8-10 are for purposes of example and illustration and are not limiting of a vast number of computing device configurations that are utilized for practicing aspects, described herein.

FIG. 8 is a block diagram illustrating physical components (i.e., hardware) of a computing device 800 with which examples of the present disclosure are be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. According to an aspect, the system memory 804 includes the automated template generation system 110. The operating system 805, for example, is suitable for controlling the operation of the computing device 800. Furthermore, aspects are practiced in conjunction with a graphics library, other operating systems, or any other application program, and are not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., automated template generation system 110) perform processes including, but not limited to, one or more of the stages of the method 700 illustrated in FIGS. 7A and 7B. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or less input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, the automated template generation system 110 is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that is accessible by the device via the radio 972 or via a wired connection between the mobile computing device 900 and a separate computing device associated with the mobile computing device 900, for example, a server computer in a distributed computing network, such as the Internet. As should be appreciated such data/information is accessible via the mobile computing device 900 via the radio 972 or via a distributed computing network. Similarly, according to an aspect, such data/information is readily transferred between computing devices for storage and use according to well-known data/information transfer and storage means, including electronic mail and collaborative data/information sharing systems.

FIG. 10 illustrates one example of the architecture of a system 1000 for providing generation of a document template 120 based on recognized composition element patterns in documents 108 associated with a user 102 as described above. Content developed, interacted with, or edited in association with the automated template generation system 110 is enabled to be stored in different communication channels or other storage types. For example, various documents may be stored using a directory service 1022, a web portal 1024, a mailbox service 1026, an instant messaging store 1028, or a social networking site 1030. The automated template generation system 110 is operative to use any of these types of systems or the like for providing automatically generated user-relevant document templates 120, as described herein. According to an aspect, a server 1020 provides the automated template generation system 110 to clients 1005a,b,c. As one example, the server 1020 is a web server providing the automated template generation system 110 over the web. The server 1020 provides the automated template generation system 110 over the web to clients 1005 through a network 1040. By way of example, the client computing device is implemented and embodied in a personal computer 1005a, a tablet computing device 1005b or a mobile computing device 1005c (e.g., a smart phone), or other computing device. Any of these examples of the client computing device are operative to obtain content from the store 1016.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing a document template relevant to a user, comprising:
   retrieving a plurality of documents stored in a database, the plurality of documents including documents of an application that are associated with the user;
   analyzing each document to determine composition elements of each document;
   determining a distance between any two documents based on a determined composition element of the two documents;
   grouping the plurality of documents into two or more clusters of documents based on determined distances;
   for a cluster of documents, determining to keep, modify, or remove the composition elements of each of the documents of the cluster based on a commonality of a style and a text of the composition elements among the documents of the cluster, wherein:
      a first subset of the composition elements having a common style and a common text among the documents of the cluster is kept;
      a second subset of the composition elements having a common style and a different text among the documents of the cluster is modified; and
      a third subset of the composition elements having a different style and a different text among the documents of the cluster is removed;
   generating a document template corresponding to the cluster of documents using the first subset of the composition elements and the second subset of the composition elements;
   displaying the document template within a user interface of the application for selection by the user; and
   in response to receiving a selection of the document template, creating a new document of the application for authoring by the user based on the document template.

2. The computer-implemented method of claim 1, further comprising:
   indexing the composition elements of the plurality of documents;
   analyzing the index to identify trends of composition elements in the plurality of documents; and
   identifying a trend associated with at least some of the composition elements in the documents of the cluster, wherein the document template includes the at least some composition elements identified in the trend.

3. The computer-implemented method of claim 2, wherein the new document includes the at least some composition elements identified in the trend.

4. The computer-implemented method of claim 1, further comprising:
   indexing composition elements of the new document;
   analyzing the index to identify trends of changes to the composition elements in the new document created from the document template; and
   modifying the document template according to an identified trend of changes to the composition elements in the new document created from the document template.

5. The computer-implemented method of claim 1, wherein determining the distance between any two documents based on the determined composition element of the two documents comprises creating a similarity matrix to determine a normalized distance between the two documents.

6. The computer-implemented method of claim 1, further comprising identifying a centroid document of each cluster of documents, wherein documents in proximity to the centroid document are used to generate the document template.

7. The computer-implemented method of claim 1, further comprising scoring each generated document template and only displaying those document templates in the user interface that score higher than a threshold level.

8. The computer-implemented method of claim 7, wherein a score of a given document template is adjusted upward in response to selection of the given document template by the user and wherein the score of the given document template is adjusted downward as a result of the given document template not being selected by the user within a period of time.

9. The computer-implemented method of claim 1, further comprising:
   identifying a series of sequences in a document where a sequence repeats consecutively within the series of sequences; and
   ignoring at least one of the repeating sequences of the series of sequences of the document.

10. The computer-implemented method of claim 1, further comprising:
   identifying a series of sequences of composition elements in one document and another series of sequences of composition elements in another document;
   aligning the series of sequences in the one document with the other series of sequences in the other document; and
   scoring the aligned series of sequences, wherein one or more of the composition elements of each document are weighted and the series of sequences are weighted according to their length.

11. The computer-implemented method of claim 1, further comprising generating a new document template in response to the user selecting a previously generated document template and then modifying one or more composition elements of the previously generated document template, wherein the new document template includes the user-modified one or more composition elements.

12. The computer-implemented method of claim 1, wherein analyzing each document to determine the composition elements comprises analyzing each document to determine at least one of:
   a collection of styles;
   formatting settings;
   graphic elements; and
   text.

13. The computer-implemented method of claim 1, wherein analyzing each document to determine the composition elements comprises emphasizing composition elements found in an initial portion of each document and de-emphasizing composition elements found in an end portion of each document.

14. The computer-implemented method of claim 1, wherein retrieving the plurality of documents comprises retrieving documents of the application authored by the user and documents authored by others and shared with the user.

15. The computer-implemented method of claim 1, wherein generating the document template corresponding to the cluster of documents using the first subset of the composition elements comprises:
   inserting the common text with the common style applied into the document template.

16. The computer-implemented method of claim 1, wherein generating the document template corresponding to the cluster of documents using the second subset of the composition elements comprises:
   inserting a placeholder for the text into the document template to which the common style is applied.

17. A system for providing a document template relevant to a user, comprising:
   a processor; and
   a memory coupled to the processor, the memory including instructions which, when executed by the processor, cause an automated template generation system to:
      retrieve a plurality of documents stored in a database, the plurality of documents including documents of an application that are associated with the user;
      analyze each document to determine composition elements of each document;
      determine a distance between any two documents based on a determined composition element of the two documents;
      group the plurality of documents into two or more clusters of documents based on determined distances;
      for a cluster of documents, determine to keep, modify, or remove the composition elements of each of the documents of the cluster based on a commonality of a style and a text of the composition elements among the documents of the cluster, wherein:
         a first subset of the composition elements having a common style and a common text among the documents of the cluster is kept;
         a second subset of the composition elements having a common style and a different text among the documents of the cluster is modified; and
         a third subset of the composition elements having a different style and a different text among the documents of the cluster is removed;

generate a document template corresponding to the cluster of documents using the first subset of the composition elements and the second subset of the composition elements;

display the document template within a user interface of the application for selection by the user; and in response to receiving a selection of the document template, create a new document of the application for authoring by the user based on the document template.

18. The system of claim 17, wherein to determine the distance between any two documents based on the determined composition element of the two documents, the automated template generation system is further operative to:

identify a series of sequences of composition elements in one document and another series of sequences of composition elements in another document;

align the series of sequences in the one document with the other series of sequences in the other document; and score the aligned series of sequences, wherein the distance determined between the two documents is based on the score of the aligned series of sequences.

19. The system of claim 17, wherein to generate the document template corresponding to the cluster of documents, the automated template generation system is further operative to:

index the composition elements of the plurality of documents;

analyze the index to identify trends of composition elements in the plurality of documents;

identify a trend associated with at least some of the composition elements in the documents of the cluster; and generate the document template to include the at least some of the composition elements identified in the trend.

20. A computer readable storage media including instructions, which when executed by a processor are operable to perform the steps comprising:

retrieving a plurality of documents stored in a database, the plurality of documents including documents of an application that are associated with a user;

analyzing each document to determine composition elements of each document;

determining a distance between any two documents based on a determined composition element of the two documents;

grouping the plurality of documents into two or more clusters of documents based on determined distances;

for a cluster of documents, determining to keep, modify, or remove the composition elements of each of the documents of the cluster based on a commonality of a style and a text of the composition elements among the documents of the cluster, wherein:

a first subset of the composition elements having a common style and a common text among the documents of the cluster is kept;

a second subset of the composition elements having a common style and a different text among the documents of the cluster is modified; and a third subset of the composition elements having a different style and a different text among the documents of the cluster is removed;

generating a document template corresponding to the cluster of documents using the first subset of the composition elements and the second subset of the composition elements;

displaying the document template within a user interface of the application for selection by the user; and in response to receiving a selection of the document template, creating a new document of the application for authoring by the user based on the document template.

* * * * *